United States Patent
Lee et al.

(10) Patent No.: US 10,972,239 B2
(45) Date of Patent: Apr. 6, 2021

(54) METHOD AND APPARATUS FOR CSI-RS SETTING FOR BEAM MANAGEMENT IN WIRELESS COMMUNICATION SYSTEM

(71) Applicant: LG ELECTRONICS INC., Seoul (KR)

(72) Inventors: Kilbom Lee, Seoul (KR); Jiwon Kang, Seoul (KR); Kijun Kim, Seoul (KR); Jonghyun Park, Seoul (KR); Minki Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/476,722

(22) PCT Filed: Jan. 9, 2018

(86) PCT No.: PCT/KR2018/000406
§ 371 (c)(1),
(2) Date: Jul. 9, 2019

(87) PCT Pub. No.: WO2018/128522
PCT Pub. Date: Jul. 12, 2018

(65) Prior Publication Data
US 2019/0356438 A1    Nov. 21, 2019

Related U.S. Application Data

(60) Provisional application No. 62/444,300, filed on Jan. 9, 2017, provisional application No. 62/455,537, filed on Feb. 6, 2017.

(51) Int. Cl.
H04L 12/50    (2006.01)
H04L 5/00    (2006.01)
H04B 7/0408    (2017.01)

(52) U.S. Cl.
CPC ......... *H04L 5/0048* (2013.01); *H04B 7/0408* (2013.01)

(58) Field of Classification Search
CPC ..................................................... H04L 12/28
(Continued)

(56) References Cited

U.S. PATENT DOCUMENTS

2014/0044044 A1    2/2014   Josiam et al.
2019/0104549 A1*   4/2019   Deng ................... H04B 7/0617

OTHER PUBLICATIONS

PCT International Application No. PCT/KR2018/000406, Written Opinion of the International Searching Authority dated May 9, 2018, 24 pages.

(Continued)

*Primary Examiner* — Dang T Ton
(74) *Attorney, Agent, or Firm* — Lee, Hong, Degerman, Kang & Waimey PC

(57) ABSTRACT

According to one embodiment of the present specification, a method for determining a beam to be used by a terminal for communication in an mmWave communication system can be provided. Here, the method for determining a beam to be used by a terminal for communication may comprise the steps of: receiving a CSI-RS from a base station; reporting a preferred primary beam to the base station on the basis of the received CSI-RS; receiving secondary beam information from the base station on the basis of the preferred primary beam; reporting a preferred secondary beam from among the secondary beam information to the base station; and receiving a setting of a CSI-RS resource from the base station on the basis of the preferred secondary beam. Here, the secondary beam information may include the preferred primary beam and at least one secondary beam to which QCL is applied.

20 Claims, 17 Drawing Sheets

(58) Field of Classification Search
USPC .......................................................... 270/329
See application file for complete search history.

(56) References Cited

OTHER PUBLICATIONS

CATT, "QCL between CSI-RS for beam management", 3GPP TSG RAN WG1 Meeting #87, R1-1611388, Nov. 2016, 3 pages.
ZTE, et al., "Beam selection and CSI acquisition for NR MIMO", 3GPP TSG RAN WG1 Meeting #87, R1-1611417, Nov. 2016, 6 pages.
CMCC, "Discussion on beam recovery for NR", 3GPP TSG RAN WG1 Meeting #87, R1-1612189, Nov. 2016, 4 pages.
NTT Docomo, "General Views on Beam Management", 3GPP TSG RAN WG1 Meeting #87, R1-1612728, Nov. 2016, 8 pages.

* cited by examiner (a)

| 1ˢᵗ CSI-RS Resource | 1ˢᵗ CSI-RS Resource | 1ˢᵗ CSI-RS Resource | 1ˢᵗ CSI-RS Resource | 2ⁿᵈ CSI-RS Resource | 2ⁿᵈ CSI-RS Resource | 2ⁿᵈ CSI-RS Resource | 2ⁿᵈ CSI-RS Resource |

METHOD AND APPARATUS FOR CSI-RS SETTING FOR BEAM MANAGEMENT IN WIRELESS COMMUNICATION SYSTEM

CROSS-REFERENCE TO RELATED APPLICATIONS

[0] This application is the National Stage filing under 35 U.S.C. 371 of International Application No. PCT/KR2018/000406, filed on Jan. 9, 2018, which claims the benefit of U.S. Provisional Application No. 62/444,300, filed on Jan. 9, 2017, and 62/455,537, filed on Feb. 6, 2017, the contents of which are hereby incorporated by reference herein in their entirety.

TECHNICAL FIELD

The present disclosure relates to a wireless communication system, and more particularly, to a method and apparatus for configuring a channel state information-reference signal (CSI-RS) for hierarchical beam management in a system.

BACKGROUND ART

An ultrahigh frequency wireless communication system based on mmWave is configured to operate at a center frequency of several GHz to several tens of GHz. Due to the characteristic of the center frequency, a pathloss may considerably occurs in a radio shadow area. Considering the pathloss, it is necessary to control and prevent beam mismatch as well as to elaborately design beamforming for a signal transmitted to a user equipment (UE) in the mmWave communication system. For this purpose, there may exist a need for a beam configuration method for beam management.

DISCLOSURE

Technical Problem

An aspect of the present disclosure devised to solve the conventional problem is to provide a beam management method.

Another aspect of the present disclosure is to provide a method of designing a channel state information-reference signal (CSI-RS) for beam management in a wireless communication system.

Another aspect of the present disclosure is to provide a method of managing beams by configuring beams as a primary beam and a secondary beam.

Another aspect of the present disclosure is to provide a method of performing beam recovery from beam mismatch.

Technical Solution

According to an embodiment of the present disclosure, a method of determining a beam to be used for communication by a user equipment (UE) in a millimeter wave (mmWave) communication system includes receiving a synchronization signal (SS) block or a channel state information-reference signal (CSI-RS) from a base station (BS), reporting a preferred primary beam based on the received SS block or CSI-RS to the BS, receiving secondary beam information based on the preferred primary beam from the BS, reporting a preferred secondary beam based on the secondary beam information to the BS, and being configured with a CSI-RS resource based on the preferred secondary beam by the BS. The secondary beam information may include information about at least one secondary beam quasi-co-located (QCLed) with the preferred primary beam.

According to an embodiment of the present disclosure, a UE for determining a beam to be sued for communication in a mmWave communication system includes a receiver configured to receive a signal from an external device, a transmitter configured to transmit a signal to an external device, and a processor configured to control the receiver and the transmitter. The processor may be configured to receive an SS block or a CSI-RS from a BS through the receiver, to report a preferred primary beam based on the received SS block or CSI-RS to the BS through the transmitter, to receive secondary beam information based on the preferred primary beam from the BS through the receiver, to report a preferred secondary beam based on the secondary beam information to the BS through the transmitter, and to be configured with a CSI-RS resource based on the preferred secondary beam by the BS. The secondary beam information may include information about at least one secondary beam QCLed with the preferred primary beam.

According to an embodiment of the present disclosure, the following is applicable commonly to the method and apparatus for determining a beam to be used for communication in an mmWave communication system.

According to an embodiment of the present disclosure, a CSI-RS resource set may be determined based on a primary beam, and a CSI-RS resource may be determined based on a secondary beam.

According to an embodiment of the present disclosure, the preferred secondary beam may be indicated by a CSI-RS resource index (CRI).

Further, according to an embodiment of the present disclosure, information about the preferred primary beam and information about the preferred secondary beam may be transmitted in at least one of a random access channel (RACH), a medium access control-control element (MAC-CE), or uplink data.

Further, according to an embodiment of the present disclosure, if the preferred primary beam and the preferred secondary beam do not satisfy a threshold, the UE may change the determined beam.

According to an embodiment of the present disclosure, when the UE changes the determined beam, the UE may transmit a beam recovery signal to the BS, and upon allocation of an uplink resource from the BS, the UE may transmit a changed preferred primary beam to the BS.

According to an embodiment of the present disclosure, the UE may receive changed preferred secondary beam information based on the changed preferred primary beam from the BS, determine a changed preferred secondary beam based on the changed preferred secondary beam information, report the changed preferred secondary beam to the BS, and be configured with a changed CSI-RS resource based on the changed preferred secondary beam by the BS.

According to an embodiment of the present disclosure, the changed preferred second beam information may include information about at least one secondary beam QCLed with the changed preferred primary beam.

According to an embodiment of the present disclosure, the primary beam may correspond to a wide beam or rough beam, and the secondary beam may correspond to a narrow beam or fine beam.

Further, according to an embodiment of the present disclosure, the CSI-RS may be a reference signal used for beam management, and correspond to at least one of a measurement reference signal (MRS) or an SS block.

Advantageous Effects

The present disclosure may provide a beam management method.

The present disclosure may provide a method of designing a channel state information-reference signal (CSI-RS) for beam management in a wireless communication system.

The present disclosure may provide a method of managing beams by configuring beams as a primary beam and a secondary beam.

The present disclosure may provide a method of performing beam recovery from beam mismatch.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the disclosure and together with the description serve to explain the principle of the disclosure. The technical features of the present disclosure are not limited to specific drawings and the features shown in the drawings are combined to construct a new embodiment. Reference numerals of the drawings mean structural elements.

FIG. 16 is a diagram illustrating a method of repeatedly allocating CSI-RS resources;

BEST MODE FOR CARRYING OUT THE DISCLOSURE

Figure 1:
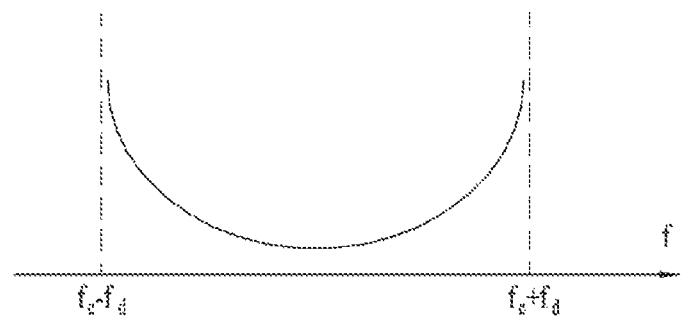
FIG. 1 is a diagram illustrating a Doppler spectrum.

Although the terms used in the present disclosure are selected from generally known and used terms, terms used herein may be varied depending on an operator's intention or customs in the art, appearance of new technology, or the like. In addition, some of the terms mentioned in the description of the present disclosure have been selected by the applicant at his or her discretion, the detailed meanings of which are described in relevant parts of the description herein. Furthermore, it is required that the present disclosure is understood, not simply by the actual terms used but by the meanings of each term lying within.

The following embodiments are proposed by combining constituent components and characteristics of the present disclosure according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present disclosure. The order of operations to be disclosed in the embodiments of the present disclosure may be changed. Some components or characteristics of any embodiment may also be included in other embodiments, or may be replaced with those of the other embodiments as necessary.

In describing the present disclosure, if it is determined that the detailed description of a related known function or construction renders the scope of the present disclosure unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present disclosure (particularly, the context of the following claims) clearly indicates otherwise.

In this document, the embodiments of the present disclosure have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present disclosure can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present disclosure clear, may be supported by the above documents.

In addition, all the terms disclosed in the present document may be described by the above standard documents. In particular, the embodiments of the present disclosure may be supported by at least one of P802.16-2004, P802.16e-2005, P802.16.1, P802.16p and P802.16.1b documents, which are the standard documents of the IEEE 802.16 system.

Hereinafter, the preferred embodiments of the present disclosure will be described with reference to the accompanying drawings. It is to be understood that the detailed description which will be disclosed along with the accompanying drawings is intended to describe the exemplary embodiments of the present disclosure, and is not intended to describe a unique embodiment which the present disclosure can be carried out.

It should be noted that specific terms disclosed in the present disclosure are proposed for convenience of description and better understanding of the present disclosure, and the use of these specific terms may be changed to another format within the technical scope or spirit of the present disclosure.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency (subcarrier spacing) | Oscillator Offset | | | |
| --- | --- | --- | --- | --- |
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler}=(v/\lambda)\cos\theta$. At this time, v is a moving speed of the UE, and λ means a wavelength of a center frequency of a radio wave which is transmitted. θ means an angle between the radio wave and a moving direction of the UE. Hereinafter, description will be given on the assumption that λ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
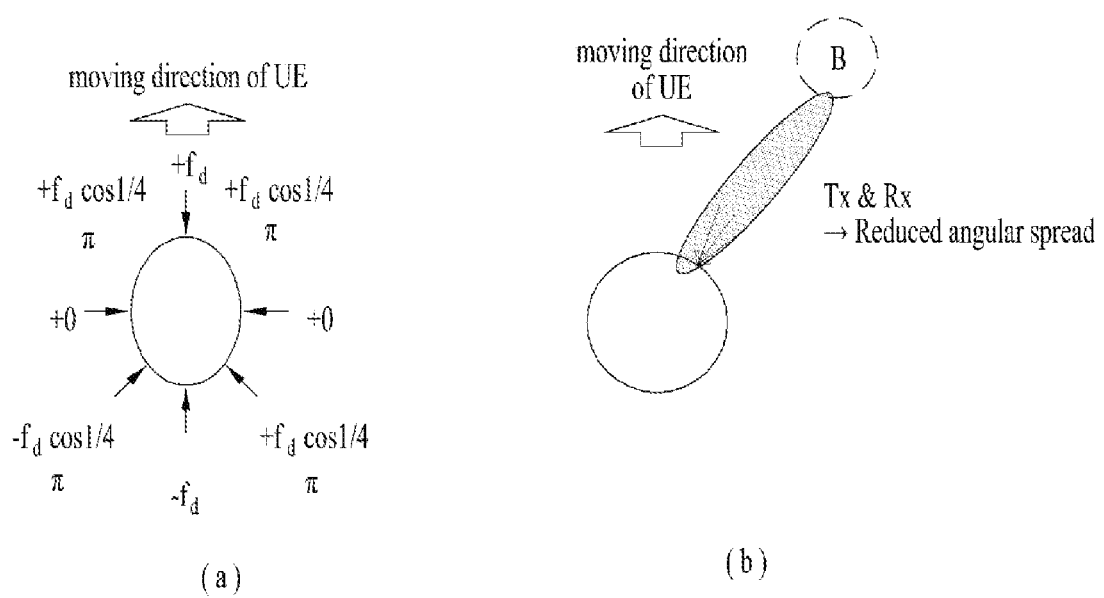
FIG. 2 is a diagram illustrating narrow beamforming related to the present disclosure.
Figure 3:
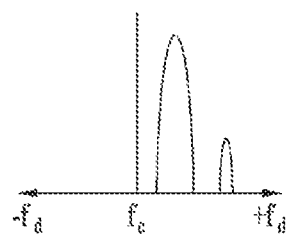
FIG. 3 is a diagram illustrating a Doppler spectrum when narrow beamforming is performed.

FIG. 2 is a diagram illustrating narrow beamforming related to the present disclosure, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
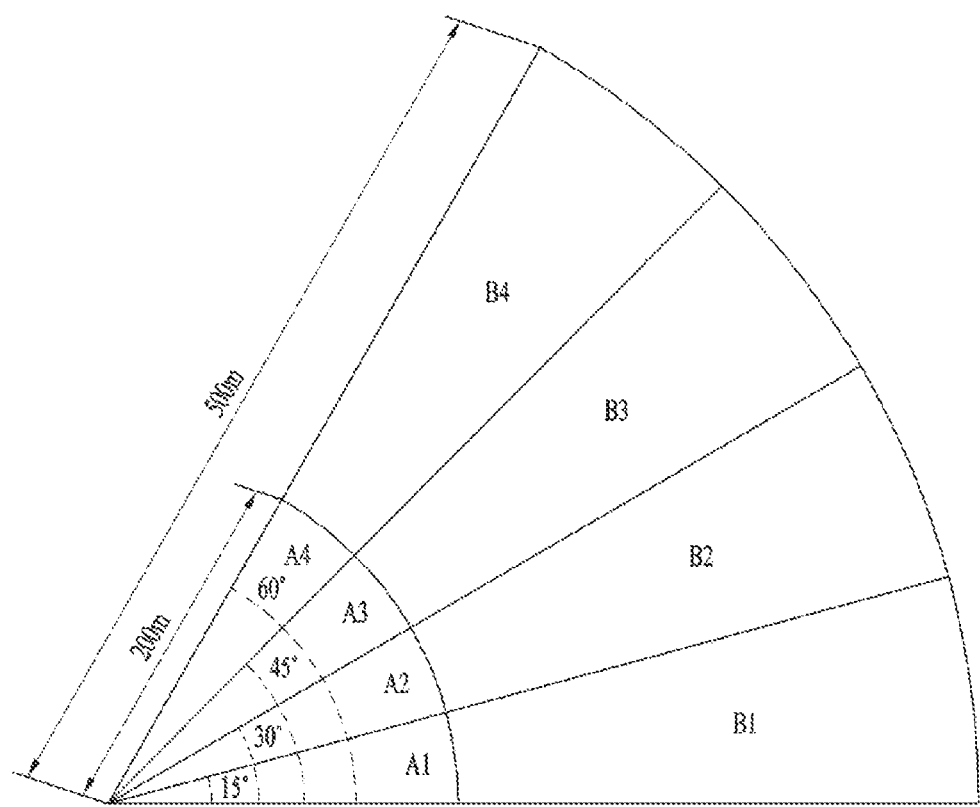
FIG. 4 is a diagram illustrating an example of a synchronization signal service area of a base station (BS)

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization procedure, timing and frequency are synchronized between the base station and the UE. In order to enable UEs in a specific cell to receive and use a synchronization signal in a synchronization procedure, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2}W$$

$$SIMR \to M^2 SINR \quad \text{[Equation 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a sp4cific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
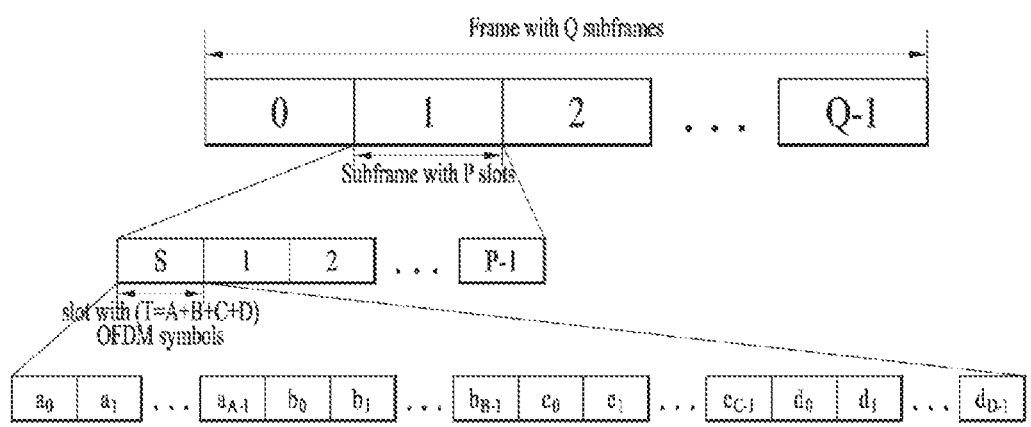
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses 0th slot (slot denoted by 'S') for the usage of synchronization. And, the 0th slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \underset{\tilde{n}}{\arg\max} \frac{\left| \sum_{i=0}^{A-2} y_{\tilde{n},i}^H y_{\tilde{n},i+1} \right|}{\sum_{i=0}^{A-2} |y_{\tilde{n},i}^H y_{\tilde{n},i+1}|}$$ [Equation 3]

where $y_{\tilde{n},i} \triangleq r[\tilde{n}+i(N+N_g):\tilde{n}+i(N+N_g)+N-1]$

In Equation 3, N, $N_g$ and i indicate a length of OFDM symbol, a length of CP (Cyclic Prefix) and an index of 01-DM symbol, respectively. r means a vector of a received signal in a receiver. Here, the equation $y_{\tilde{n},i}$,27 $r[\tilde{n}+i(N+N_g):\tilde{n}+i(N+N_g)+N-1]$ is a vector defined with elements ranging from $(\tilde{n}+i(N+N_g))_{th}$ element to $(\tilde{n}+i(N+N_g)+N-1)_{th}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \underset{\tilde{n}}{\arg\max} \frac{\left| \sum_{i=0}^{A-1} y_{\tilde{n},i}^H s \right|^2}{\sum_{i=0}^{A-1} |y_{\tilde{n},i}|^2 \sum_{i=0}^{A-1} |s|^2}$$ [Equation 4]

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning procedure is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning procedure can be embodied into 4 kinds of processes. First of all, the base station transmits beams to 4 areas in sequence [i]. The UE determines a beam decided as a most appropriate beam among the beams in aspect of a received SINR [ii]. The UE feds back information on the selected beam to the base station [iii]. The base station transmits data using a beam having the direction of the feedback [iv]. Through the above beam scanning procedure, the UE can receive DL data through a beam having an optimized received SINR.

Zadoff-Chu sequence is described in the following. Zadoff-Chu sequence is called Chu sequence or ZC sequence and defined as Equation 5.

$$X_r[n] = e^{\frac{j\pi rn(n+1)}{N}}$$ [Equation 5]

In Equation 5, N indicates a length of sequence, r indicates a root value, and $x_r[n]$ indicates an nth element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(X_r^{(i)})^H X_r^{(j)} = \begin{cases} N & \text{for } i = j \\ 0 & \text{elsewhere} \end{cases}$$ [Equation 6]

In Equation 6, $x_r^{(i)}$ is a sequence resulting from cyclic-shifting $x_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$X_{r_1}^H X_{r_2} = \begin{cases} N & \text{for } r_1 = r_2 \\ \frac{1}{\sqrt{N}} & \text{elsewhere} \end{cases} \quad \text{[Equation 7]}$$

In equation 7, r1 or r2 is a coprime of N. For example, if N=111, 2≤$r_1$, $r_2$≤110 always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \quad \text{[Equation 8]}$$

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_N$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 9]}$$

From Equation 9, it can be observed that columns and rows are orthogonal to each other.

Figure 6:
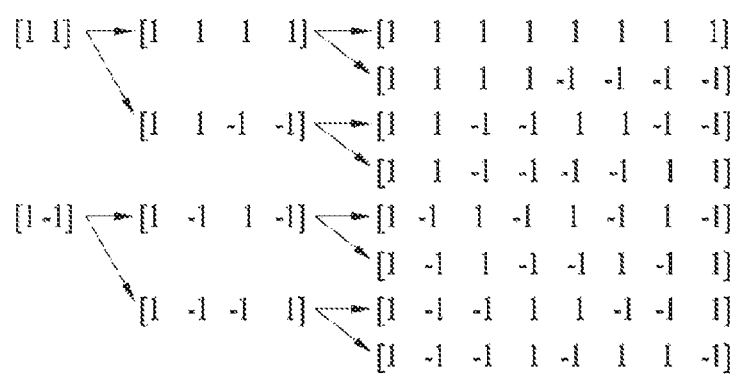
FIG. 6 illustrates a structure of orthogonal variable spreading factor (OVSF) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 -1 1 -1] is orthogonal to all of [1 1], [1 1 1 1], and [1 1 -1 -1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
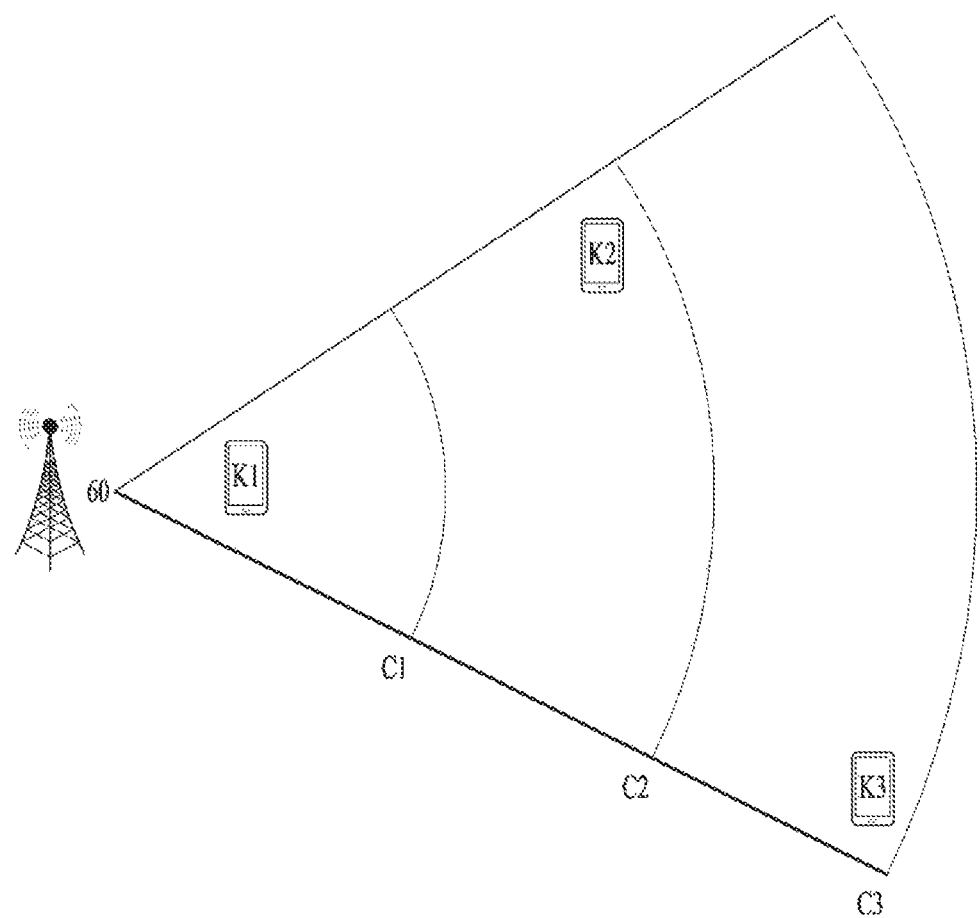
FIG. 7 is a diagram to describe a disposed situation of user equipments (UEs)

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

[Equation 10]

P_PRACH_Initial=min{P_CMAX, preambleInitialReceivedTargetPower+PL}

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preamble-InitialReceived-TargetPower | Pathloss | Necessary transmit power | Transmit power | Additional necessary power |
| --- | --- | --- | --- | --- | --- |
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

In the following, phase noise related to the present disclosure is explained. Jitter generated on a time axis appears as phase noise on a frequency axis. As shown in equation 11 in the following, the phase noise randomly changes a phase of a reception signal on the time axis.

$$r_n = s_n e^{j\phi_n} \quad \text{[Equation 11]}$$

where $s_n = \sum_{k=0}^{N-1} d_k e^{j2\pi \frac{kn}{N}}$

Parameters $r_n$, $s_n$, $d_k$, $\phi_n$ of the equation 11 respectively indicate a reception signal, a time axis signal, a frequency axis signal, and a phase rotation value due to the phase noise. In the equation 11, if the reception signal is passing through a DFT (Discrete Fourier Transform) procedure, it may be able to have equation 12 described in the following.

[Equation 12]

$$y_k = d_k \frac{1}{N}\sum_{n=0}^{N-1} e^{j\phi_n} + \frac{1}{N}\sum_{\substack{t=0\\t\neq k}}^{N-1} d_t \sum_{n=0}^{N-1} e^{j\phi_n} e^{j2\pi(t-k)m/N}$$

In Equation 12, $$\frac{1}{N}\sum_{n=0}^{N-1} e^{j\phi_n}, \frac{1}{N}\sum_{\substack{t=0\\t\neq k}}^{N-1} d_t \sum_{n=0}^{N-1} e^{j\phi_n} e^{j2\pi(t-k)m/N}$$

indicate a CPE (common phase error) and ICI (inter-cell interference), respectively. In this case, as correlation between phase noises is getting bigger, the CPE of the equation 12 has a bigger value. The CPE is a sort of CFO (carrier frequency offset) in a wireless LAN system. However, since the CPE corresponds to phase noise in the aspect of a terminal, the CPE and the CFO can be similarly comprehended.

A terminal eliminates the CPE/CFO corresponding to phase noise on a frequency axis by estimating the CPE/CFO. A procedure of estimating the CPE/CFO on a reception signal should be preferentially performed by the terminal to accurately decode the reception signal. In particular, in order to make the terminal precisely estimate the CPE/CFO, a base station can transmit a prescribed signal to the terminal. The signal transmitted by the base station corresponds to a signal for eliminating phase noise. The signal may correspond to a pilot signal shred between the terminal and the base station in advance or a signal changed or copied from a data signal. In the following a signal for eliminating phase noise is commonly referred to as a PCRS (Phase Compensation Reference Signal), or a PNRS (Phase Noise Reference Signal)

Figure 8:
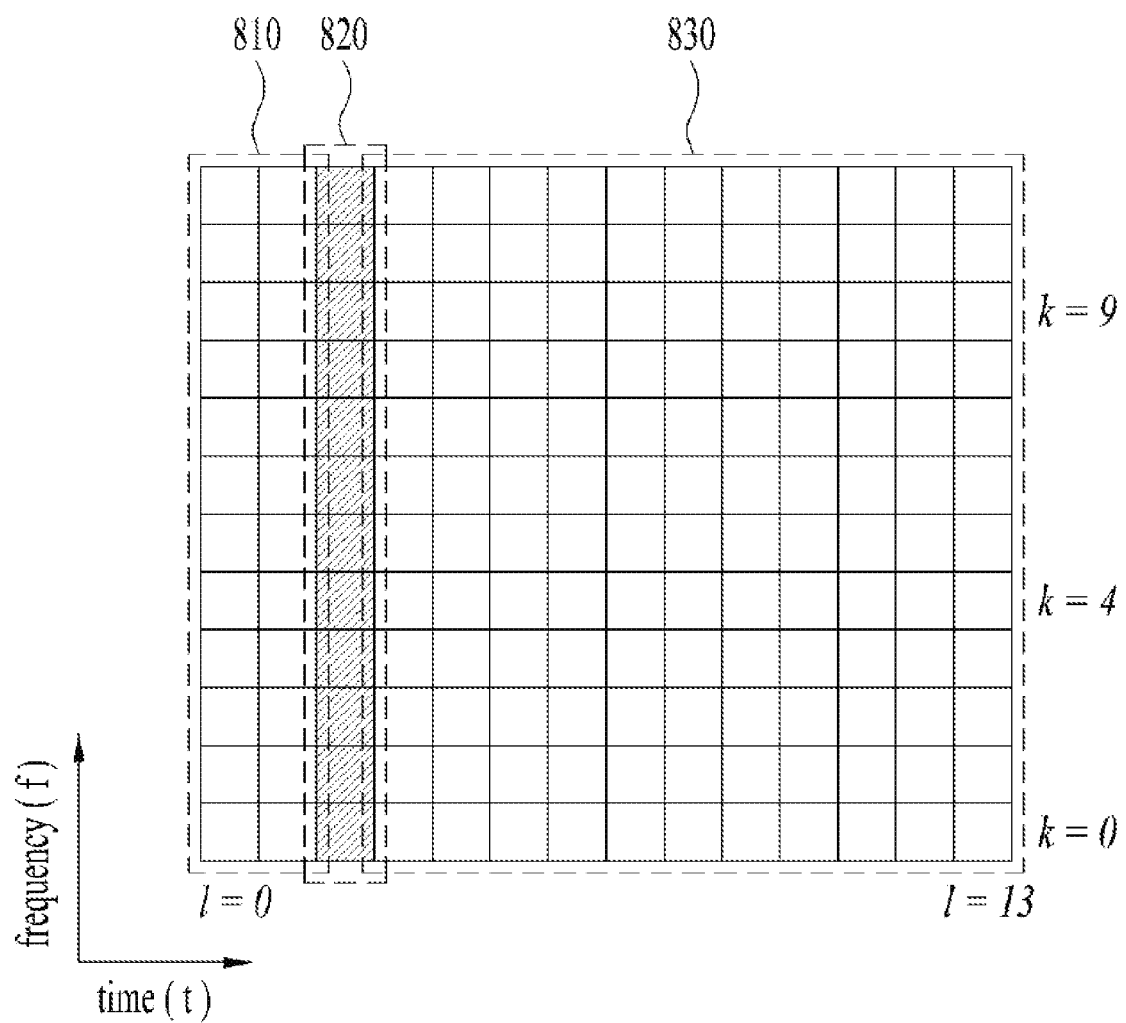
FIG. 8 is a diagram illustrating a resource region structure used in a communication system using mmWave.

FIG. 8 is a diagram illustrating a resource region structure used in a communication system using mmWave. A communication system using such a ultrahigh frequency band as mmWave uses a frequency band having physical characteristic different from that of a legacy LTE/LTE-A communication system. Hence, it is necessary for the communication system using the ultrahigh frequency band to use a structure of a resource region different from a structure of a resource region used in a legacy communication system. FIG. 8 illustrates an example of a downlink resource structure of a new communication system.

It may consider an RB pair consisting of 14 OFDM (Orthogonal Frequency Division Multiplexing) symbols in a horizontal axis and 12 subcarriers in a vertical axis. In this case, first 2 (or 3) OFDM symbols 810 are allocated for a control channel (e.g., PDCCH (Physical Downlink Control Channel)), a next one OFDM symbol 820 is allocated for a DMRS (DeModulation Reference Signal), and the remaining OFDM symbols 830 are allocated for a data channel (e.g., PDSCH (Physical Downlink Shared Channel)).

Meanwhile, in the resource region structure shown in FIG. 8, a PCRS for estimating the aforementioned CPE (or, the CFO), or a PNRS can be transmitted to a terminal in a manner of being carried on a partial RE (resource element) of the region 830 to which a data channel is assigned. The signals correspond to a signal for estimating phase noise. As mentioned in the foregoing description, the signal may correspond to a pilot signal or a signal changed or copied from a data signal.

2. Proposed Information Providing Method

As described before, beamforming may be important to a communication system using the mmWave band. In mmWave, large pathloss may be overcome with a beamforming gain. That is, pathloss arising from the use of a high frequency may be compensated for by a beamforming gain, such that communication is conducted efficiently. For this purpose, a beam may be defined sharply. Accordingly, multiple beams may be defined for one cell. For example, the transmission/reception point (TRP) panel structure defined in 3GPP may be of "4×8×2=M×N×P". In the case of panel-based beam definition, at least 32 beams may be determined.

For example, 112, 224 or 448 beams may be defined in VzW. If there are multiple beams, multiple reference signal (RS) resources may be required. That is, an eNB should show all of multiple beams, which may lead to a large RS requirement. Further, in order to distinguish multiple beams from one another, a large number of bits may be needed correspondingly. For example, 32 beams may be represented in 5 bits, and for more beams, more bits may be needed. As a consequence, signaling overhead may increase.

As described above, hierarchical beam grouping may be required for efficient management of multiple beams. To do so, channel state information-reference signal (CSI-RS) resources may be applied. Although CSI-RS resources are used for link quality in the legacy LTE system, CSI-RS resources for beams may be applied separately. For example, the legacy LTE CSI-RS resources may be of CSI-RS resource type I. On the other hand, the CSI-RS resources for beams may be referred to as CSI-RS resource type II, to which the present disclosure is not limited. However, the following description is given with the appreciation that CSI-RS resources are of CSI-RS type II. Further, RS resources defined for beams may refer to the above-described CSI-RS resources, although under a different name, and thus are not limited to any particular names 2-1. Primary Beam and Secondary Beam in Partial Quasi-Co-Location (OCL) Relationship When hierarchical beam grouping is performed based on CSI-RS resources, a primary beam and a secondary beam may be defined. The primary beam may correspond to a measurement RS (MRS). The primary beam may also correspond to a CSI-RS resource. For example, the primary beam may correspond to a CSI Resource set. Further, in relation to hierarchical beam grouping, the primary beam may correspond to a wide beam or rough beam. The secondary beam may be in a partial QCL relationship with the primary beam. For example, the secondary beam may be included in the primary beam and correspond to one or more CSI-RS resources included in the CSI-RS resource set. A CSI-RS resource index (CRI), which is information included in a CSI-RS, may indicate the secondary beam. Further, the secondary beam may correspond to a narrow beam or fine beam.

In another example, the secondary beam may correspond to one or two CSI-RS ports. However, the following description will be given in the context of a secondary beam corresponding to one or more CSI-RS resources. Nonetheless, an embodiment may be available, in which a secondary beam corresponds to a CSI-RS port, to which the present disclosure is not limited. That is, the primary beam may cover a wider area than the secondary beam, and a beam for a narrower area may be specified by the secondary beam.

"Partial QCL" may mean applying the same large-scale property (LSP) in a system. For example, it may be considered that multiple physical antennas form a single frequency network (SFN), thus forming logical antenna port group A, and logical antenna port group B is mapped to individual physical antennas. That is, an antenna port of logical antenna port group A is mapped to multiple physical antennas so that a corresponding port signal may be transmitted simultaneously through the multiple antennas. The physical antennas may differ in LSP. In contrast, an antenna port of logical antenna group B may be mapped to one of the physical antennas to which antenna port group A is mapped, so that a corresponding port signal is transmitted through the one antenna. In the above situation, a receiver end may infer the LSP of a channel that a signal transmitted from antenna port group B has experienced from the LSP of a channel obtained from a signal transmitted through antenna port group A. That is, antenna port group B may be in the partial QCL relationship with antenna port group A.

In a multi-path fading channel environment, for example, the channel delay of a signal transmitted through antenna port group B may be a part of the channel delay of a signal transmitted through antenna port group A. Further, the channel Doppler value of the signal transmitted through antenna port group B may be a part of the channel Doppler value of the signal transmitted through antenna port group A.

Accordingly, the receiver may configure parameters for channel estimation of a signal received through antenna port group B by using the LSP of a signal of antenna port group A.

Further, antenna port group A and antenna port group B are in such a relationship that a beam direction for increasing the reception performance of a signal transmitted through antenna port group B belongs to beam directions for increasing the reception performance of a signal transmitted through antenna port group A. Therefore, the receiver may search for a beam direction for reception of a signal transmitted through antenna port group B in beam directions for reception of a signal transmitted through antenna port group A. In this manner, a beam direction search speed may be increased. The primary beam and the secondary beam may be placed in a relationship similar to the relationship between antenna port group A and antenna port group B. That is, the primary beam and the secondary beam are in the "partial QCL" relationship, and the primary beam may be used to acquire the secondary beam.

For example, one MRS may correspond to the primary beam (wide beam or rough beam). The MRS may be a CSI-RS. While the term MRS is used throughout the following description, this does not limit the disclosure.

For example, the primary may also be acquired from a synchronization signal (SS) (e.g., a primary SS (PSS) or a secondary SS (SSS)). The primary beam may be induced from an SS block, instead of an MRS. For example, the received signal received power (RSRP) of the primary beam may be defined as an SS block RSRP. That is, the primary beam may be defined by using at least one of the MRS or the SS block. Although the following description is given in the context of the MRS, the same thing may apply to the SS block.

For example, the primary beam induced from at least one of the MRS or the SS block may be defined for both of an idle-mode UE and a connected-mode UE. The present disclosure is not limited to this embodiment.

For example, as the primary beam and the secondary beam are in the "partial QCL" relationship, the primary beam may be determined in correspondence with a CSI-RS resource set and the secondary beam may be determined in correspondence with a CSI-RS resource of the CSI-RS resource set. That is, the secondary beam corresponds to a CSI-RS resource, and the primary beam may be determined by a CSI-RS resource set, in consideration of the partial QCL relationship between the primary beam and the secondary beam. Accordingly, a CRI may indicate the secondary beam. That is, a beam that a UE actually uses may be the secondary beam. Considering that the primary beam is in the partial QCL relationship with the secondary beam, the primary beam may be defined to increase beam management efficiency. A description will be given below of each configuration based on the premise that a primary beam and a secondary beam are in the partial QCL relationship, and the secondary beam corresponds to a CSI-RS resource.

2-2. CSI-RS Resource-Based Hierarchical Beam Grouping

For hierarchical beam grouping based on CSI-RS resources, a primary beam and a secondary beam may be defined. The primary beam may correspond to an MRS or an SS block. Further, the primary beam may correspond to a CSI-RS resource. For example, the primary beam may correspond to a CSI-RS resource set, and the secondary beam may correspond to a CSI-RS resource. That is, the primary beam may be determined in correspondence with a CSI-RS resource set, and the secondary beam may be determined in correspondence with a CSI-RS resource included in the primary beam, in consideration of the partial QCL relationship.

In another example, the secondary beam may correspond to a CSI-RS port. For example, the CSI-RS port corresponding to the secondary beam may be distinguished from a legacy LTE CSI-RS port. The LTE CSI-RS port may be of CSI-RS port type I, whereas the CSI-RS port of the secondary beam may be of CSI-RS port type II. However, the following description is given with the appreciation that a CSI-RS port is of CSI-RS port type II. Further, a port defined for a beam may refer to a CSI-RS port, although under a different name from CSI-RS port, and thus is not limited to any particular name.

Further, in relation to hierarchical beam grouping, the primary beam may correspond to a wide beam or rough beam, and the secondary beam may correspond to a narrow beam or fine beam.

More specifically, the eNB may determine CSI-RS resources by the primary beam. The eNB may define a group of secondary beams belonging to the primary beam (or the same MRS). That is, the secondary beams may be included in the primary beam. Further, in relation to CSI content, legacy CSI may include a CRI, a rank indicator (RI), a precoding matrix indicator (PMI), and a channel quality indicator (CQI). If the CSI content is still used for beam management, the CRI may correspond to a secondary beam.

Figure 9:
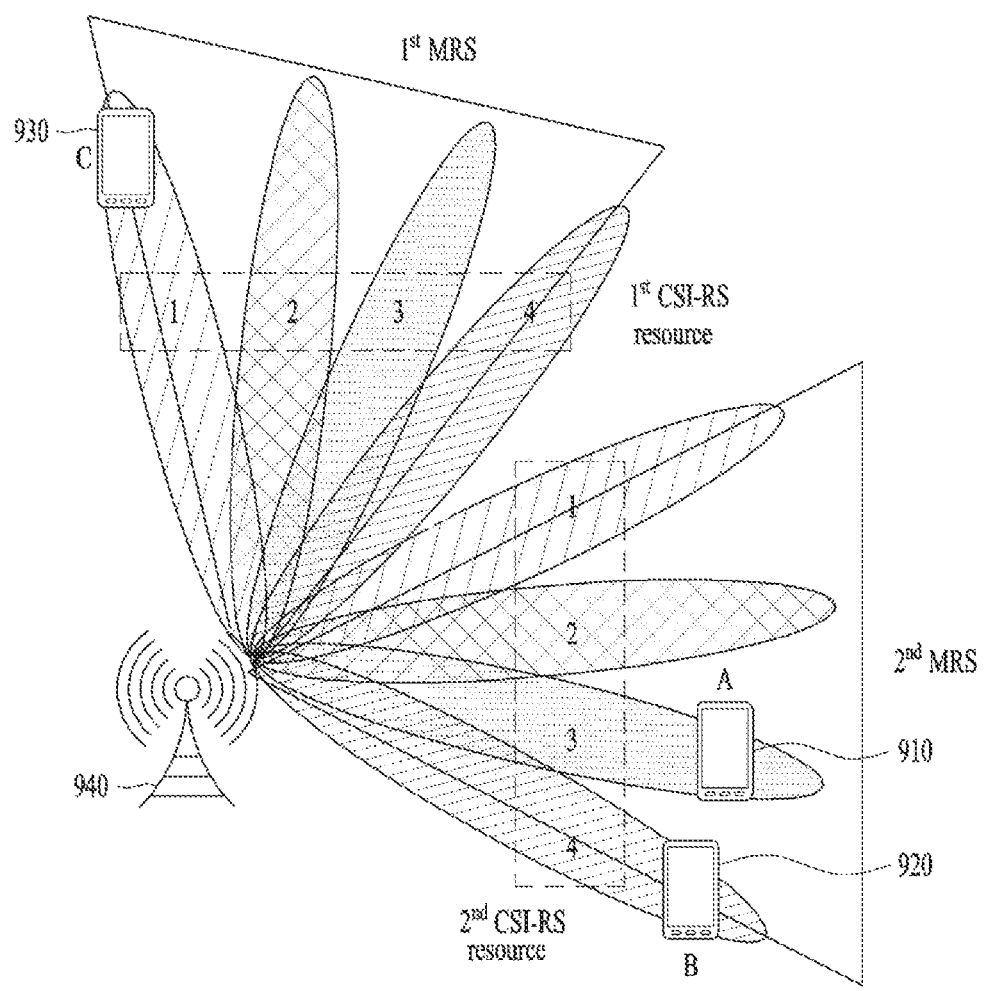
FIG. 9 is a diagram illustrating primary beams and secondary beams in a communication system using mmWave.

Referring to FIG. 9, for example, an eNB 910 may form two primary beams (MRSs or SS blocks). A first primary beam (or first MRS) and a second primary beam (or second MRS) may cover areas in different directions. The first primary beam may be configured with a first CSI-RS resource, and the second primary beam may be configured with a second CSI-RS resource. That is, the two primary beams may be distinguished from each other by different CSI-RS resources. For example, one primary beam may be divided into four secondary beams. Each of the secondary beams is a narrow beam included in the primary beam. UE A 910, UE B 920, and UE C 930 may correspond to different primary and secondary beams, respectively based on beamforming, which will be described below.

Further, for example, an MRS may be a CSI-RS. For the convenience of description, the term MRS is interchangeably used with CSI-RS.

Figure 10:
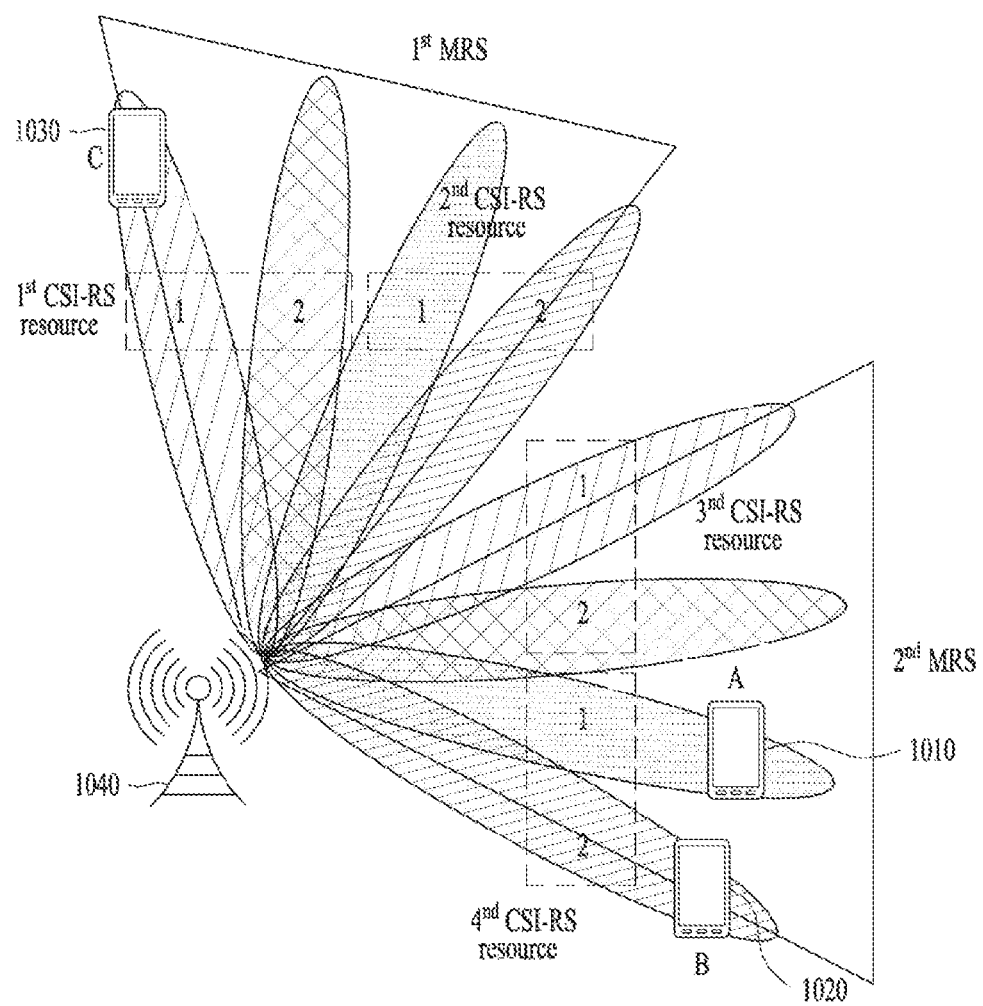
FIG. 10 is a diagram illustrating primary beams and secondary beams in a communication system using mmWave.

In another example, referring to FIG. 10, a primary beam may be defined by two CSI-RS resources. Referring to FIG. 10, a first MRS may be mapped to first and second CSI-RS resources in the time domain. Further, a second MRS may be mapped to third and fourth CSI-RS resources in the time domain. That is, each primary beam may be defined by two CSI-RS resources.

Further, for example, the primary beam for each of UEs 1010, 1020, and 1030 may be specified by an MRS, as illustrated in Table 4. In the above embodiment, each primary beam may be mapped to CSI-RS resources in a 1:2 correspondence. Further, while the term MRS is used herein, MRS is interchangeably used with CSI-RS, and the above embodiment should not be construed as limiting the present disclosure.

TABLE 4

| UE A = (2nd MRS)UE B = (2nd MRS)UE C = (1st MRS) |
|---|

As described above, a primary beam may be mapped to CSI-RS resources in a 1:1 or 1:N correspondence. If a primary beam is mapped to CSI-RS resources in a 1:N correspondence, a plurality of CSI-RS resources may exist in the primary beam, as described before.

Further, as described before in relation to CSI-RS-based hierarchical beam grouping, the primary beam may be induced from an SS as well as an MRS. A primary beam induced from an MRS and a primary beam induced from an SS may be applied equally to the foregoing and following embodiments, not limited to the foregoing embodiments.

2-3. CSI-RS Resource Configuration for Beam Management

Now, a description will be given of a CSI-RS resource configuration for beam management. In the following description, a slot may be a minimum scheduling unit. A slot may include one or more consecutive OFDM symbols, conceptually identical to an LTE subframe. The present disclosure is not limited to this embodiment.

Figure 11:
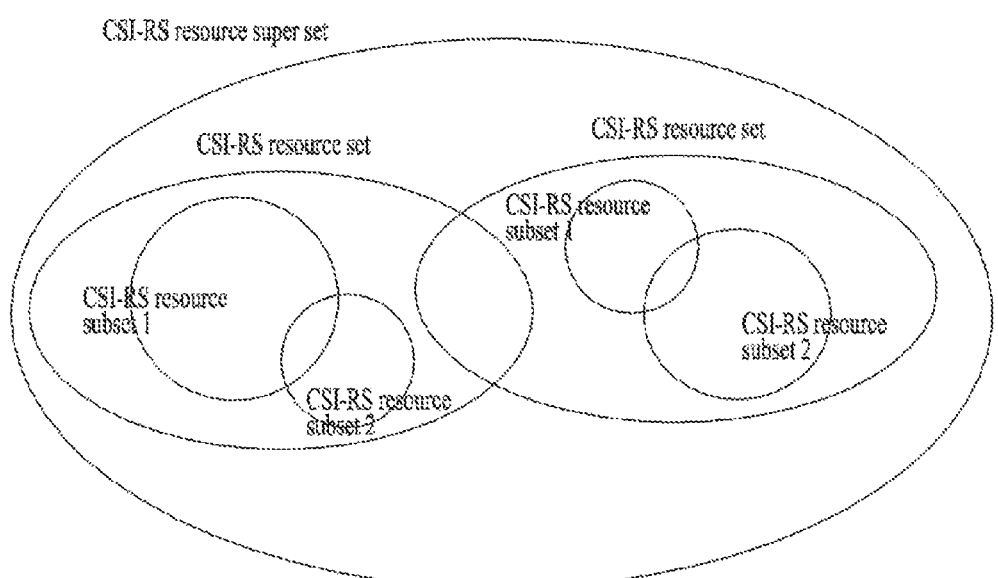
FIG. 11 is a diagram illustrating a method of configuring a channel state information-reference signal (CSI-RS) resource set.

For example, CSI-RS resources may form a CSI-RS resource set. As illustrated in FIG. 11, a CSI-RS resource superset, a CSI-RS resource set, a CSI-RS resource subset, and a CSI-RS resource may be configured. Their mutual inclusion relation is given in [Equation 13].

[Equation 13]

CSI-RS resource superset>CSI-RS resource set>CSI-RS resource subset>CSI-RS resource That is, the CSI-RS resource superset may be the largest category. CSI-RS resource sets may be included in the CSI-RS resource superset. Each CSI-RS resource set may include CSI-RS resource subsets each including CSI-RS resources, as illustrated in FIG. 11.

More specifically, the CSI-RS resource superset may be all CSI-RS resources available for a TRP. A CSI-RS resource superset may be basically defined as one or more TRPs. Further, a CSI-RS resource set may be one or more CSI-RS resource groups configured for each UE by a TRP. A CSI-RS resource subset may be a CSI-RS resource group that the TRP activates in the CSI-RS resource set configured for the UE. For example, when beam management is performed based on a CSI-RS resource subset, the UE may perform measurement and reporting based on the CSI-RS resource subset.

Figure 12:
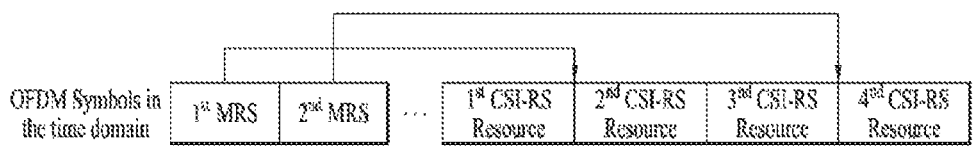
FIG. 12 is a diagram illustrating a method of allocating measurement reference signals (MRSs) and CSI-RS resources in the time and frequency domains.

For example, FIG. 12 may illustrate a CSI-RS resource set-based operation method. More specifically, the eNB may configure the UE with one or more CSI-RS resources of a CSI-RS resource set by at least one of RRC signaling or DCI. That is, the eNB may configure a UE-dedicated CSI-RS resource set for each UE.

For example, each CSI-RS resource may be configured at a time position. For example, referring to FIG. 12, CSI-RS resources may be configured as described in Table 5.

TABLE 5

| CSI-RS resource #1: OFDM symbol #11 CSI-RS resource #2: OFDM symbol #12CSI-RS resource #3: OFDM symbol #13 CSI-RS resource #4: OFDM symbol #14 |
|---|

Figure 13:
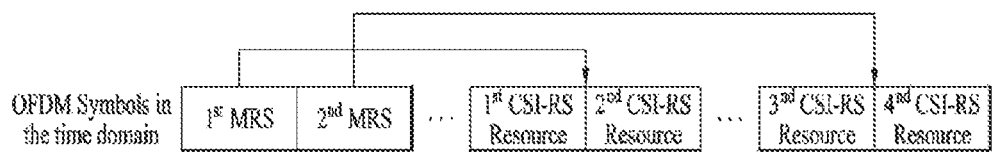
FIG. 13 is a diagram illustrating a method of allocating MRSs and CSI-RS resources in the time domain.

In another example, referring to FIG. 13, each CSI-RS resource may be configured at a time position in a slot. For example, CSI-RS resources may be configured separately in odd-numbered and even-numbered slots, as illustrated in Table 6.

TABLE 6

| CSI-RS resource #1: OFDM symbol #11 for odd slot CSI-RS resource #2: OFDM symbol #12 for odd slot CSI-RS resource #3: OFDM symbol #11 for even slot CSI-RS resource #4: OFDM symbol #12 for even slot |
|---|

The present disclosure is not limited to the foregoing embodiments, and other embodiments are also available. In the above embodiment, it is necessary to additionally preset a transmission periodicity. For example, the process in the above embodiment may lead to large control information. Accordingly, the transmission periodicity may be configured by RRC signaling, instead of DCI.

Then, if CSI-RS resource subsets have been defined, the eNB may indicate to the UE a CSI-RS resource subset to be activated in the CSI-RS resource set configured for the UE. That is, the eNB may determine a CSI-RS resource to be used from among the CSI-RS resources of the CSI-RS resource set configured for the UE.

Figure 14:
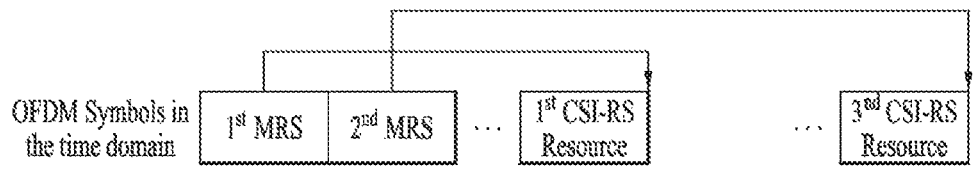
FIG. 14 is a diagram illustrating a method of allocating MRSs and CSI-RS resources in the time domain.

That is, if the eNB uses a CSI-RS resource subset, the eNB may provide information about the CSI-RS resource subset to the UE. However, if CSI-RS resource subsets are not defined, the eNB may skip this process. Herein, the terms CSI-RS resource set and CSI-RS resource subset may be used in the same meaning. For example, referring to FIG. 14, only a first CSI-RS resource (CSI-RS resource #1) and a third CSI-RS resource (CSI-RS resource #3) may be activated. If the concept of CSI-RS resource subset is used as described before, CSI-RS resource #1 and CSI-RS resource #3 may be CSI-RS resource subsets.

For example, the UE may report its preferred CSI-RS resource index to the eNB. If the UE reports the preferred CSI-RS resource index based on a CSI-RS resource t, the UE may transmit the report by 2-bit information (#1 to #4). On the other hand, if the UE reports the preferred CSI-RS resource index based on a CSI-RS resource subset, the UE may transmit the report by 1-bit information (#1 and #2). That is, the number of bits for representing information may be different depending on whether reporting is performed at a CSI-RS resource set level or a CSI-RS resource subset level. The present disclosure is not limited to this embodiment.

For example, since one or more CSI-RS resources are selected from a predetermined CSI-RS resource set in the above process, the size of control information may be small. Accordingly, the UE may need a dynamic configuration in order to minimize feedback overhead and measurements. Therefore, the above process may be configured by at least one of MAC signaling or DCI. The present disclosure is not limited to this embodiment.

In the following description, a slot is described as a minimum scheduling unit. A slot may include one or more consecutive OFDM symbols, conceptually identical to an LTE subframe.

In the above and following tables, [x] may indicate that a configuration in x is optional (e.g., "[CSI-RS ports of each CSI-RS resource]" means that the CSI-RS ports of each CSI-RS resource may be used optionally, when needed).

2-4. Aperiodic CSI-RS Resource Configuration Procedure

In mmWave, an eNB and a UE may perform a beam management procedure. Herein, P1, P2 and P3 may be defined. In P2, DL Tx beams of the eNB may be swept, while an Rx beam of the UE may be fixed. The UE may select the best of the swept Tx beams of the eNB. The UE may then report the selected beam to the eNB. That is, P2 may be a procedure performed during beam sweeping at the eNB, and a beam may be configured in this procedure. In P3, the eNB may repeatedly transmit a DL Tx beam in the same direction, while the UE sweeps Rx beams. The UE may select the best of the swept Rx beams, thereby performing beam management.

P1 may be a case in which the UE is sweeping Rx beams while the eNB is sweeping Tx beams. In P1, the best Tx beam of the eNB and the best Rx beam of the UE may be detected. That is, the best beam pair may be detected.

Figure 15:
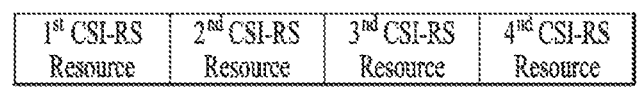
FIG. 15 is a diagram illustrating a method of repeatedly allocating CSI-RS resources.
Figure 15:
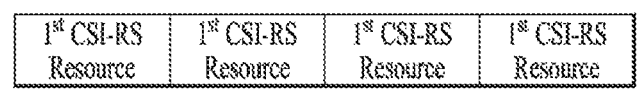

To support the P1, P2 and P3 operations, CSI-RS resources may be configured aperiodically. For example, when the eNB sweeps Tx beams in P2, different CSI-RS resources may be repeatedly transmitted as illustrated in FIG. 15(a). That is, the eNB may repeatedly transmit the CSI-RS resource of each available Tx beam in the time domain.

In P3, when the UE sweeps Rx beams, the eNB may repeatedly transmit the same CSI-RS resource as illustrated in FIG. 15(b). Herein, the eNB may repeatedly transmit one CSI-RS resource along the time axis in a specific direction.

For CSI-RS resource transmissions for the P1, P2 and P3 operations, a configuration may be required, which will be described below.

2-4-1. CSI-RS Resource Configuration for P3

When CSI-RS resources are transmitted for the above-described P3 operation, CSI-RS parameters for the operation P3 may include at least one of the transmission timing of each CSI-RS, an OFDM symbol index in each CSI-RS resource slot (or subframe), a seed identifier (ID) of each CSI-RS, or a repetition number. In another example, a CSI-RS resource subset may optionally be included as a CSI-RS parameter. In another example, at least one of a UE Rx beam ID, a TRP ID, or an MRS ID for each CSI-RS resource may optionally be defined as a CSI-RS parameter. In another example, a CSI-RS port of each CSI-RS resource may optionally defined as a parameter. In another example, a CS-RS port of each CSI-RS resource may optionally be defined. Herein, the repetition number may indicate the number of times a CSI-RS of the same beam direction is repeatedly transmitted in the P3 operation.

More specifically, in relation to the P3 operation, the eNB may configure the UE with at least one CSI-RS resource of a CSI-RS resource set or CSI-RS resource subset by at least one of RRC signaling, a MAC-CE, or DCI. That is, a UE dedicated CSI-RS resource set may be allocated to the UE.

For example, referring to Table 7 below, a transmission timing, the position of an OFDM symbol in a slot (or subframe), a seed ID, a UE Rx beam, and a repetition number may be defined as parameters required for CSI-RS resource transmission. However, this is merely an embodiment, and thus different parameters may be configured.

TABLE 7

CSI-RS resource #1: (6, OFDM symbol #7, Seed ID = 101, UE Rx beam ID = 1, # of repetitions = 4)CSI-RS resource #3: (6, OFDM symbol #11, Seed ID = 102, UE Rx beam ID = 4, # of repetitions = 4)

It may be noted from FIG. 16 in relation to the operation based on Table 7 that each of CSI-RS resource #1 and CSI-RS resource #3 is repeatedly transmitted four times. For example, the parameters listed in Table 7 above may be configured by at least one of RRC signaling, a MAC-CE, or DCI. However, in consideration of signaling overhead, most of the information may be configured by RRC signaling or a MAC-CE as illustrated in Table 8. On the other hand, at least one of the CSI-RS resource indexes or the transmission timings may be configured by DCI. The transmission timings may be configured for the respective CSI-RS resources or may be determined to be one value, for transmission.

TABLE 8

| OFDM symbol index within slot (or subframe) of each CSI-RS resourceSeed ID of each CSI-RS resource[CSI-RS ports of each CSI-RS resource][UE Rx beam ID or {TRP ID, MRS ID} of each CSI-RS resource]# of repetitions |
| --- |

In another example, compared to the above configurations, parameters indicated by RRC signaling or a MAC-CE may also be defined in DCI. Further, parameters defined in DCI may also be configured by RRC signaling or a MAC-CE. The present disclosure is not limited to this embodiment.

Further, for example, the position of the last OFDM symbol instead of the repetition number may be included as a parameter, not limited to this embodiment.

In another example, Table 9 below adds CSI-RS ports to Table 8. Port #2 belonging to CSI-RS resource 1 and port #2 belonging to CSI-RS resource #3 may be transmitted repeatedly. The present disclosure is not limited to this embodiment.

TABLE 9

| CSI-RS resource #1: (6, OFDM symbol #7, Seed ID = 101, UE Rx beam ID = 1, # of repetitions = 4, port #2)CSI-RS resource #3: (6, OFDM symbol #11, Seed ID = 102, UE Rx beam ID = 4, # of repetitions = 4, port #2) |
| --- |

2-4-2. CSI-RS Resource Configuration for P2

For the P2 operation, a CSI-RS resource configuration may be required. That is, while the eNB is transmitting a signal by changing Tx beams, the UE may perform beam management by an Rx beam. For example, CSI-RS parameters for the P2 operation may include at least one of a CSI-RS resource subset configuration, a transmission timing, an OFDM symbol index within a slot (or subframe) of each CSI-RS resource, or a seed ID of each CSI-RS resource. Further, for example, at least one of a UE Rx beam ID, a TRP ID, or an MRS ID for each CSI-RS resource may optionally be defined as a CSI-RS parameter. In another example, a CSI-RS port of each CSI-RS resource may optionally be defined as a CSI-RS resource parameter. The present disclosure is not limited to this embodiment.

For example, for the P2 operation, the eNB may configure the UE with at least one CSI-RS resource of a CSI-RS resource superset, a CSI-RS resource set, or a CSI-RS resource subset. The configuration may be configured by at least one of RRC signaling, a MAC-CE, or DCI. That is, a UE dedicated CSI-RS resource set may be allocated to the UE.

For example, referring to Table 10 below, a transmission timing, the position of an OFDM symbol in a slot, a seed ID, and a UE Rx beam, for transmission of each CSI-RS resource, may be defined as parameters in the P2 operation.

TABLE 10

| CSI-RS resource #1: (6, OFDM symbol #11, Seed ID = 101, UE Rx beam ID = 1)CSI-RS resource #2: (6, OFDM symbol #12, Seed ID = 101, UE Rx beam ID = 1)CSI-RS resource #3: (6, OFDM symbol #13, Seed ID = 102, UE Rx beam ID = 4) CSI-RS resource #4: (6, OFDM symbol #14, Seed ID = 102, UE Rx beam ID = 4) |
| --- |

For example, a transmission timing may be determined based on Table 10 above. For example, if a current transmission timing is K, a timing T at which a CSI-RS resource is transmitted may be determined by [Equation 14].

$$T = K + \text{offset} + 6 \quad \text{[Equation 14]}$$

Herein, a slot or subframe may be a basic unit for a transmission timing. Further, for example, an offset in [Equation 14] may be configured by at least one of RRC signaling or a MAC-CE. When a timing is calculated by [Equation 14], the offset may be applied equally (or uniformly).

For example, the parameters for CSI-RS resources may be configured by at least one of RRC signaling, a MAC-CE, or DCI. Notably, various parameters may be set, and information may be transmitted separately, thereby minimizing signaling overhead.

Table 11 below may be one example serving the purpose. That is, the following information may be configured by RRC signaling or a MAC-CE.

TABLE 11

| OFDM symbol index within slot (or subframe) of each CSI-RS resourceSeed ID of each CSI-RS resource[CSI-RS ports of each CSI-RS resource] [UE Rx beam ID or {TRP ID, MRS ID} of each CSI-RS resource] |
| --- |

Further, at least one of the index(es) or transmission timings of CSI-RS resources may be configured by DCI. For example, the transmission timings may be configured for the respective CSI-RS resources or may be determined to be one value, for transmission.

In another example, unlike the above configuration, parameters configured by RRC signaling or a MAC-CE may be defined in DCI. Further, parameters defined in DCI may be configured by RRC signaling or a MAC-CE, and the present disclosure is not limited to this embodiment.

In another example, DCI may include at least one of an on/off flag for transmission of a CSI-RS resource set (or subset) or a transmission timing. That is, all CSI-RS resources of the CSI-RS resource set (or subset) may be enabled by DCI, thereby enabling the transmission without the need for separately indicating CSI-RS resource indexes, and the present disclosure is not limited to this embodiment.

2-4-3. CSI-RS Resource Configuration for P1

For the P1 procedure, one or more activated CSI-RS resources in a CSI-RS resource set may be selected as described before. That is, a CSI-RS resource subset may be determined. Herein, the transmission period of each CSI-RS resource may be configured. For example, referring to FIG.

17(a), a configuration described in Table 12 below may be set for each CSI-RS resource. However, this is merely an embodiment, which should not be construed as limiting.

TABLE 12

CSI-RS resource #1: 5 msCSI-RS resource #2: 5 ms CSI-RS resource #3: 10 ms CSI-RS resource #4: 10 ms In another example, for periodically transmitted CSI-RS resources, their transmission periods may be set as one value, irrespective of resource indexes. That is, for example, the periods of all of the CSI-RS resources may be set to 5 ms in Table 12.

Figure 17:
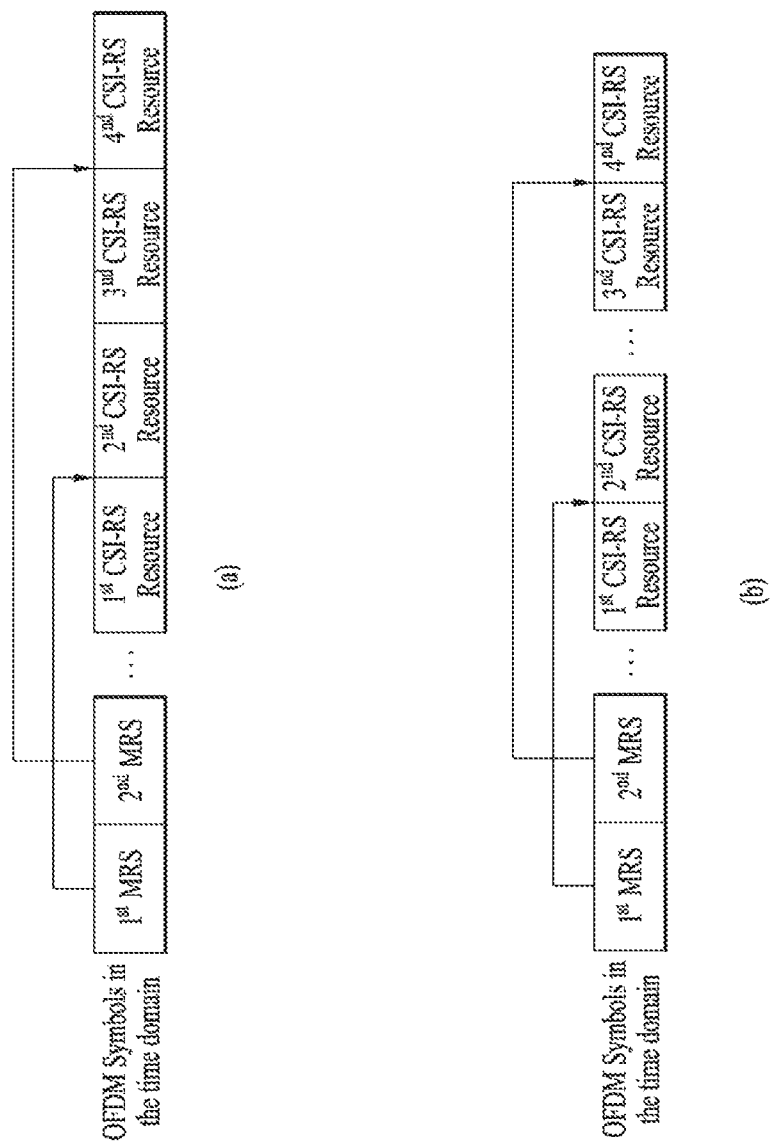
FIG. 17 is a diagram illustrating a method of allocating MRSs and CSI-RS resources in the time domain.

In another example, a CSI-RS resource may be configured with an OFDM symbol in a slot of the CSI-RS resource. For example, each CSI-RS resource may be configured based on an OFDM symbol as described in Table 13 in FIG. 17(a). In another example, as illustrated in FIG. 17(b), a CSI-RS resource may be represented by an OFDM symbol in an odd-numbered or even-numbered slot, which is described in Table 14.

TABLE 13

CSI-RS resource #1: OFDM symbol #11 CSI-RS resource #2: OFDM symbol #12CSI-RS resource #3: OFDM symbol #13 CSI-RS resource #4: OFDM symbol #14

TABLE 14

CSI-RS resource #1: OFDM symbol #11 for odd slotCSI-RS resource #2: OFDM symbol #12 for odd slotCSI-RS resource #3: OFDM symbol #11 for even slotCSI-RS resource #4: OFDM symbol #12 for even slot 2-4-3-1. Seed ID Configuration For example, a seed ID needs to be configured for each CSI-RS resource. More specifically, the UE may determine a sequence used for a CSI-RS resource by using a corresponding ID and other information (e.g., the position of an OFDM symbol carrying the CSI-RS resource). Notably, the corresponding ID may be a cell ID of a serving TRP or a0ny other TRP. For example, a TRP may indicate any value to the UE by higher-layer signaling.

Figure 18:
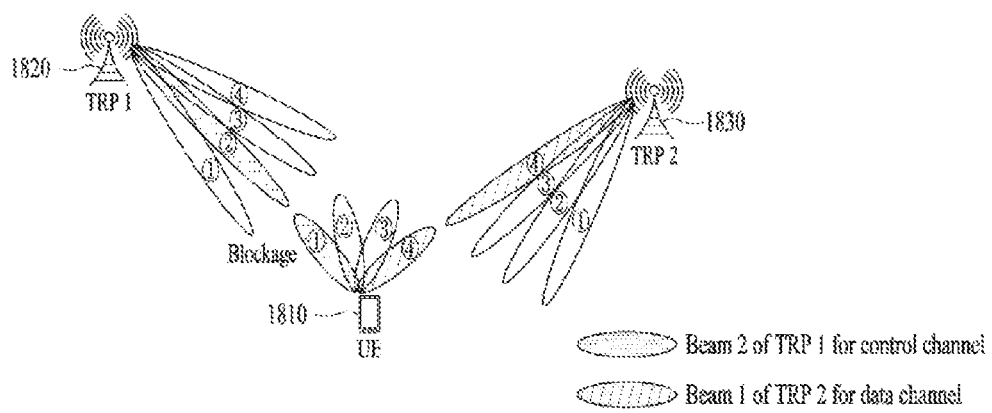
FIG. 18 is a diagram illustrating a beam configuration method.
Figure 19:
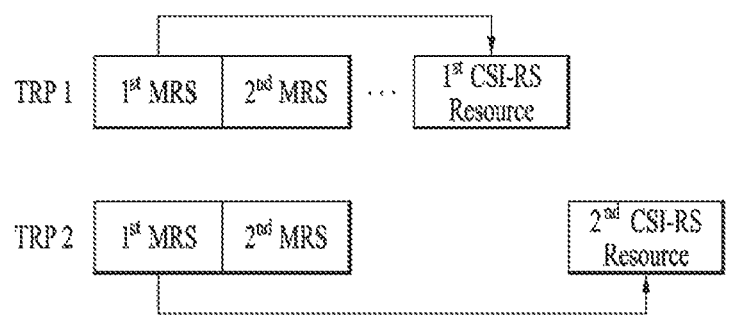
FIG. 19 is a diagram illustrating a method of allocating MRSs and CSI-RS resources in the time domain.

For example, FIGS. 18 and 19 are diagrams illustrating a method of servicing one UE 1810 by two TRPs 1820 and 1830. Referring to FIGS. 18 and 19, the UE 1810 may determine a primary beam by a first MRS from TRP 1 1820. The UE 1810 may additionally determine a primary beam by a second MRS from TRP 2 1830. The UE 1810 reports the two primary beams to an eNB, and the eNB may configure CSI-RS resources for the UE. For example, the two CSI-RS resources may have different cell IDs because the TRPs are different. Therefore, the TRP for each CSI-RS needs to be identified by defining a seed ID for the CSI-RS resource.

In another example, it is necessary to define at least one of a UE Rx beam ID, a TRP ID, or an MRS and SS block ID for each CSI-RS resource, for CSI-RS resource configuration. More specifically, in FIG. 18, a second Tx beam of TRP 1 1820 is coupled to a first Rx beam of the UE 1810, and a fourth Tx beam of TRP 2 1820 is coupled to a fourth Rx beam of the UE 1810. For example, the UE 1810 may not be allowed to use two or more Rx beams at the same time. Therefore, the UE 1810 needs to sweep Rx beams, when receiving a first/second CSI-RS resource. Thus, there is a need for providing information that distinguishes the CSI-RS resources from each other.

2-4-3-2. Use of UE Rx Beam ID or (TRP ID, MRS and/or SS block ID) for Each CSI-RS Resource There is a need for defining a factor representing a UE Rx beam corresponding to each CSI-RS resource. That is, each CSI-RS resource and a UE Rx beam need to be QCLed. For example, to enable the eNB to determine a UE Rx beam for each CSI-RS resource, when the UE reports a primary beam, the UE may also report information about a UE Rx beam used to receive the primary beam. The number of bits may be determined according to the number of UE Rx beams. Given four UE Rx beams, 2 bits may be required. That is, it is necessary to further report information about a specific Rx beam based on the number of UE Rx beams to the eNB.

In another example, at least one of a TRP ID, an SS block ID, or an MRS ID may be configured simultaneously for each CSI-RS resource. The UE may determine a TRP and a primary beam index for a corresponding CSI-RS resource. Further, for example, a primary beam may be represented as partial QCLed with each CSI-RS resource. The eNB may indicate a QCL relationship between each CSI-RS resource and at least one of a TRP ID, an SS block ID, or an MRS ID. Thus, the UE may acquire primary beam information. Subsequently, the UE may detect a UE Rx beam suitable for a corresponding CSI-RS resource by using the UE Rx beams.

For example, the TRP ID may be replaced with "a seed ID for each CSI-RS". However, in the presence of a plurality of TRPs, the use of the same seed ID may cause ambiguity. That is, the plurality of TRPs may not be distinguished from each other. Accordingly, when the same seed ID is used, the plurality of TRPs may define different SS block IDs or MRS IDs. As such, the plurality of TRPs may be identified, and the present disclosure is not limited to this embodiment.

Further, for example, if a factor representing a UE Rx beam corresponding to each CSI-RS resource is defined, the QCL relationship between the CSI-RS resource and an MRS may have no relation to the UE Rx beam. However, if the UE Rx beam is changed in the above situation, the UE Rx beam defined in the CSI-RS resource may not established. For example, if a UE Rx beam is changed due to rotation of the UE or an obstacle, the UE Rx beam specified for a CSI-RS resource may not match an actual Rx beam of the UE. Then, the UE needs to report a primary beam to the eNB and then the eNB needs to reconfigure a CSI-RS resource, so that the UE may receive the CSI-RS resource by changing its UE Rx beam. As a result, signaling overhead may increase.

On the other hand, if the QCL relationship between a CSI-RS resource and an MRS (or SS block ID) is directly indicated, the above reconfiguration may not be required in spite of a change in a UE Rx beam caused by rotation of the UE. That is, in the case where each CSI-RS resource is placed in the QCL relationship with at least one of a TRP ID, an SS block ID, or an MRS ID, if a UE Rx beam is changed in view of rotation of the UE or an obstacle, a configuration may be changed based on the QCL relationship without a reconfiguration procedure.

2-5 Primary Beam Reporting Method Using At Least One of MRS or SS Block

As described before, beam management may be performed based on CSI-RS resources. For example, beam management information may be beam state information (BSI). BSI may refer to information about an afore-mentioned preferred primary beam and an RSRP related to the primary beam. There may exist a need for a method of feeding back BSI to the eNB and detecting a primary beam and a secondary beam by the UE, which will be described below.

More specifically, a primary beam may be detected based on an MRS, as described before. That is, the UE may acquire one or more primary beams from an MRS. For example, the MRS may be a CSI-RS. That is, the MRS may be a CSI-RS used for beam management. The following description is given in the context of an MRS, to which the present disclosure is not limited, and the MRS may be interpreted as a CSI-RS.

After the UE acquires the one or more primary beams, the UE may feed back information about the primary beams to the eNB. That is, the UE may feed back BSI. For example, the UE may select a primary beam by using at least one of an MRS or an SS block, and calculate the RSRP of the primary beam, that is, generate BSI.

The UE may feed back preferred primary beams to the eNB on at least one of a random access channel (RACH), a MAC-CE, a UL data channel (e.g., PUSCH), or a UL control channel (e.g., PUCCH). That is, the UE may provide information about the preferred primary beams to the eNB in various manners.

2-5-1. Feedback Method Via RACH

For example, the UE may feedback preferred beam information to the eNB in a RACH procedure. More specifically, the UE may report one or more preferred primary beams and BSI of the primary beams to the eNB by an RRC connection request during initial access to the eNB. Further, for example, when the UE is disconnected from the eNB without performing a release procedure, the UE may report the one or more preferred primary beams and the BSI of the primary beams to the eNB by an RRC connection re-establishment request.

However, since the RACH procedure is performed in a contention-based manner, collision may occur and thus a strict latency requirement may be required. Further, in the case of a UE dedicated RACH, the above collision may be prevented, but it is necessary to allocate an RACH preamble to each UE. On the other hand, if the legacy RACH procedure is reused, a UE common resource is used, thereby obviating the need for additional resource allocation. Further, for example, reporting through the RACH procedure may be aperiodic reporting triggered by the UE.

That is, the UE may feed back preferred primary beam information to the eNB in the RACH procedure, and the present disclosure is not limited to this embodiment.

2-5-2. Feedback Method Based on SR (Scheduling Request)

In another example, if the signal strength measurement of an MRS is less than a threshold, the UE may transmit an SR to the eNB. The threshold may be a predetermined reference value and set to a different value. The eNB may allocate a UL message for UL transmission to the UE. The UE may report BSI in an L3 message of the UL message. For example, this may be an L3 operation, in which although much information is reported, latency may occur. For example, an RRC message may be used as the L3 message, and the present disclosure is not limited to this embodiment.

In another example, the UE may report BSI in a MAC-CE of the allocated UL message to the eNB. The operation of transmitting BSI in a MAC-CE is carried out in the MAC and thus may be an L2 operation.

In another example, the UE may multiplex the allocated UL message with BSI, for transmission. That is, this is a physical layer operation in which the BSI may be transmitted based on an L2 operation. This operation may be fastest. That is, the UE may perform aperiodic reporting in a UL message allocated by the eNB according to the SR. Herein, the UE may transmit the BSI based on at least one of the L3, L2 or L1 operation for the allocated UL message, and the present disclosure is not limited to this embodiment.

As described above, since L2 and 13 are based on a MAC-CE and a message, respectively, they may be implemented by an SR for UL data transmission without an additional SR for requesting BSI reporting.

However, for example, if a target block error rate (BLER) is 0.1 D, the failure rate may be high. Further, since the transmission failure may result in long latency, it may take a long time for beam recovery. Moreover, since the eNB determines a modulation and coding scheme (MCS) based on a previous beam state, if the current beam state is poor, the failure probability may increase.

In contrast, uplink control information and data are multiplexed and transmitted in the L1 operation. Therefore, related information needs to be reported to the eNB. That is, an additional SR for requesting BSI reporting needs to be defined. In the L1 operation-based case, the eNB may identify beam failure by the SR signal, and thus take an appropriate measure (e.g., low MCS).

In another example, a UE dedicated PRACH preamble may be used, instead of the SR for requesting BSI reporting. That is, upon receipt of the PRACH preamble, the eNB may report BSI on an RACH preamble response (RAR) or a physical downlink control channel (PDCCH) and allocate UL resources.

That is, if a beam state is too poor for the UE to request beam reporting or beam switching, the UE may define an SR for requesting BSI reporting (or a UE dedicated PRACH preamble) separately, and transmit the SR for requesting BSI reporting to the eNB, thereby performing beam recovery.

In another example, the eNB may select one of the above methods and indicate the selected method to the UE by DCI.

For example, if the link quality is poor, the eNB may indicate the UE to transmit BSI in an L3 message or a MAC-CE. In another example, if the link quality is poor or is expected to be poor, the eNB may indicate the UE to multiplex BSI with a UL message and transmit the multiplexed signal.

The MCS of the BSI may be determined according to a rule. Alternatively, the MCS of the BSI may be configured by at least one of RRC signaling, a MAC-CE, or DCI, and the present disclosure is not limited to this embodiment.

In another example, if a dedicated SR for requesting BSI reporting is defined and the UE transmits the dedicated SR to the eNB, the above operation may be triggered. Alternatively, for example, a BSI transmission method may be predetermined by RRC signaling or a MAC-CE and the UE may report BSI in the predetermined BSI transmission method. This method may be aperiodic reporting triggered by the UE and performed using UL resources allocated by the eNB.

Figure 20:
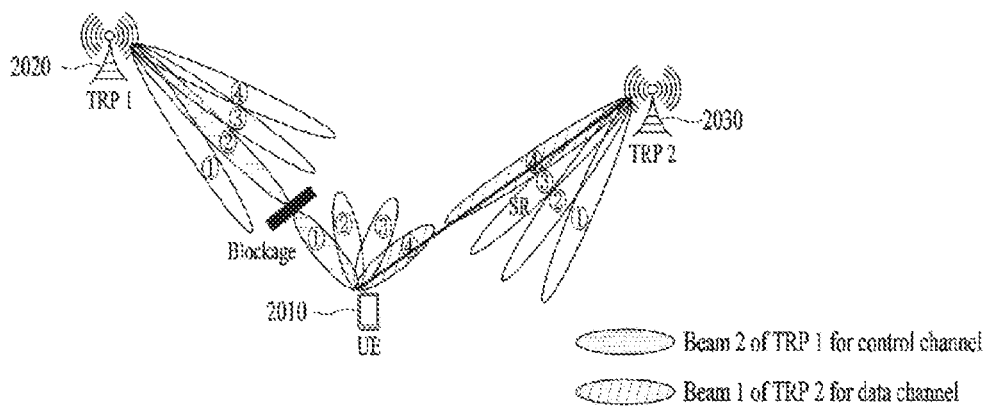
FIG. 20 is a diagram illustrating a beam configuration method.

Further, for example, referring to FIG. 20, a second beam of TRP 1 2020 may be linked to a first beam of a UE 2010. As illustrated in FIG. 20, the link may be disconnected due to an obstacle or a UE movement. Or a signal may not satisfy a threshold. Then, if the link is disconnected, the UE 2010 may transmit an SR to TRP 2 2030. Upon receipt of the SR, TRP 2 2030 may allocate UL resources to the UE 2010.

TRP 2 2030 should transmit a response (e.g., UL grant) to the SR within a predetermined time. The predetermined time may be time B. Time B may be set by at least one of a rule, RRC signaling, or a MAC-CE. The UE 2020 may use a fourth Rx beam during time B. For example, TRP 1 2020 and TRP 2 2030 may allocate the same or different SR resources to the UE 2010. In the case of the same SR resources, the overhead of the SR resources may be determined according to the number of UEs irrespective of the number of TRPs. Notably, a channel (e.g., X2 channel) may be needed between the TRPs. In the case of different SR resources, the overhead of the SR resources may increase by as much as the number of TRPs. However, it may be clear which one between TRP 1 2020 and TRP 2 2030 is requested by the UE 2010.

As such, even though the current link is disconnected, the UE may directly report beam information (BSI and/or secondary beam information (e.g., a CSI-RS resource, CSI-RS port, and an RSRP)) as well as data information to the other TRP. As a consequence, latency may be minimized when the link is disconnected.

Further, for example, beam reconfiguration may be performed by using a case in which a feedback for data transmitted on UL by the UE is negative acknowledgement (NACK).

Figure 21:
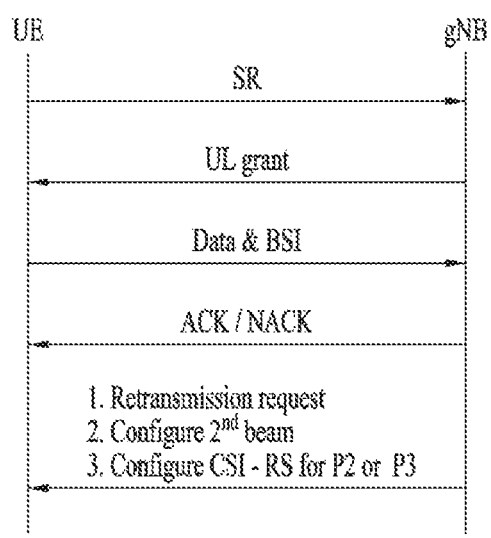
FIG. 21 is a diagram illustrating a method of transmitting beam state information (BSI) to a BS.

More specifically, referring to FIG. 21, if the feedback for data transmitted on UL by the UE is NACK, the eNB may request retransmission on an existing beam to the UE.

In another example, if the feedback for data transmitted on UL by the UE is NACK, the eNB may select one of secondary beams reported by the UE and indicate the selected secondary beam to the UE by DCI or a MAC-CE. Subsequently, the UE may perform data retransmission on the secondary beam. In another example, if the feedback for data transmitted on UL by the UE is NACK, a CSI-RS may be reconfigured based on the foregoing P2 and P3 operations, as illustrated in FIG. 21.

2-5-3. PUCCH-Based

The UE may report beam management information on a UL control channel to the eNB. For example, since PUCCH information has a small number of feedback bits, the UE may set the number of primary beams to be reported to 1 or a small number. The number of reportable beams may be configured by the eNB. Further, for example, the UE may report only the index of a preferred primary beam on a PUCCH, without transmitting the RSRP of the primary beam. That is, the UE may report only part of BSI on the PUCCH.

Further, for example, considering that the PUCCH has a small number of feedback bits, the eNB may allocate a PUSCH resource to the UE, and the UE may report BSI in the allocated PUSCH resource. The UE may not report a primary beam on the PUCCH. That is, the UE may only request a reconfiguration of a CSI-RS resource set via the PUCCH, and report BSI via the PUSCH to the eNB.

In another example, the UE may not be allocated a UL resource separately through an SR. Instead, the UE may perform beam management in periodically transmitted PUCCH resources. In this manner, only when beam management is required, the eNB may request reporting to the UE. Further, for example, if a PUCCH period is short, beam information may be reported faster than on an RACH, a MAC-CE, or a UL data channel That is, this may be efficient, if the UE's location is frequently changed or the UE's movement is taken into account.

As described above, the use of the PUCCH enables support of both of periodic reporting and aperiodic reporting. That is, as described above, the UE may directly report BSI on the PUCCH. Further, the UE may aperiodically report BSI on the PUCCH, only when a problem occurs to beam management, and the present disclosure is not limited to this embodiment.

A primary beam may be reported faster in the order of PUCCH (L1), MAC CE (L2), control message (L3), and RACH. That is, the primary beam may be reported fastest on the PUCCH in which beam reporting is performed by multiplexing control information and data information (L1). In contrast, the primary beam may be reported most slowly on the RACH that operates in a contention-based manner The present disclosure is not limited to this embodiment.

2-6. Beam Recovery Procedure and CSI-RS Resource Update Method

Figure 22:
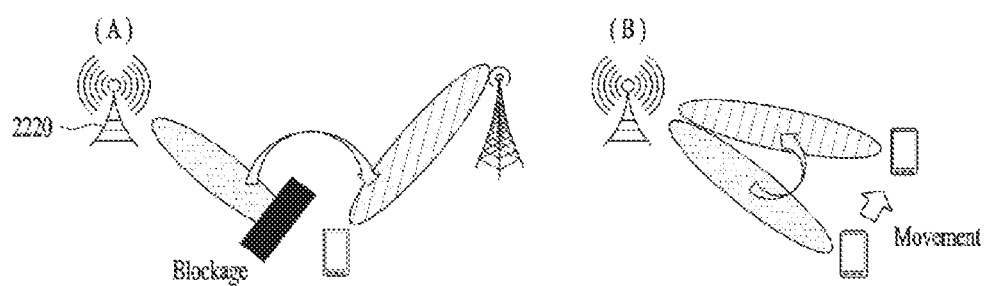
FIG. 22 is a diagram illustrating a situation requiring beam recovery.

A beam between a UE 2210 and an eNB 2220 needs to be changed in view of movement of the UE 2210 or an obstacle. The beam may be adjusted in a beam refinement or beam recovery procedure. For example, referring to FIG. 22, even though a Tx beam of the eNB 2220 is maintained, if an Rx beam of the UE 2210 is changed, beam refinement or beam recovery may be required. In another example, even though the Rx beam of the UE 2210 is maintained, if the Tx beam of the eNB 2220 is changed, beam refinement or beam recovery may be required. Further, if both of the Rx beam of the UE 2210 and the Tx beam of the eNB 2220 are changed, beam refinement or beam recovery may be required. That is, once a beam between the UE 2210 and the eNB 2220 is changed, beam refinement or beam recovery may be required.

For example, the UE 2210 may measure the RSRPs of a wide beam and a narrow beam, compare the RSRPs, and then determine whether to change a UE Rx beam. For example, if the RSRP of the wide beam is larger than the RSRP of the narrow beam, the UE 2210 may change the Rx beam. That is, if the RSRP of the wide beam is larger than the RSRP of the narrow beam in a situation in which the narrow beam is used in consideration of an mmWave environment, the direction of the beam may be wrong. Accordingly, the UE 2210 may change the Rx beam. On the contrary, if the RSRP of the wide beam is less than the RSRP of the narrow beam, the UE may maintain the Rx beam.

Figure 23:
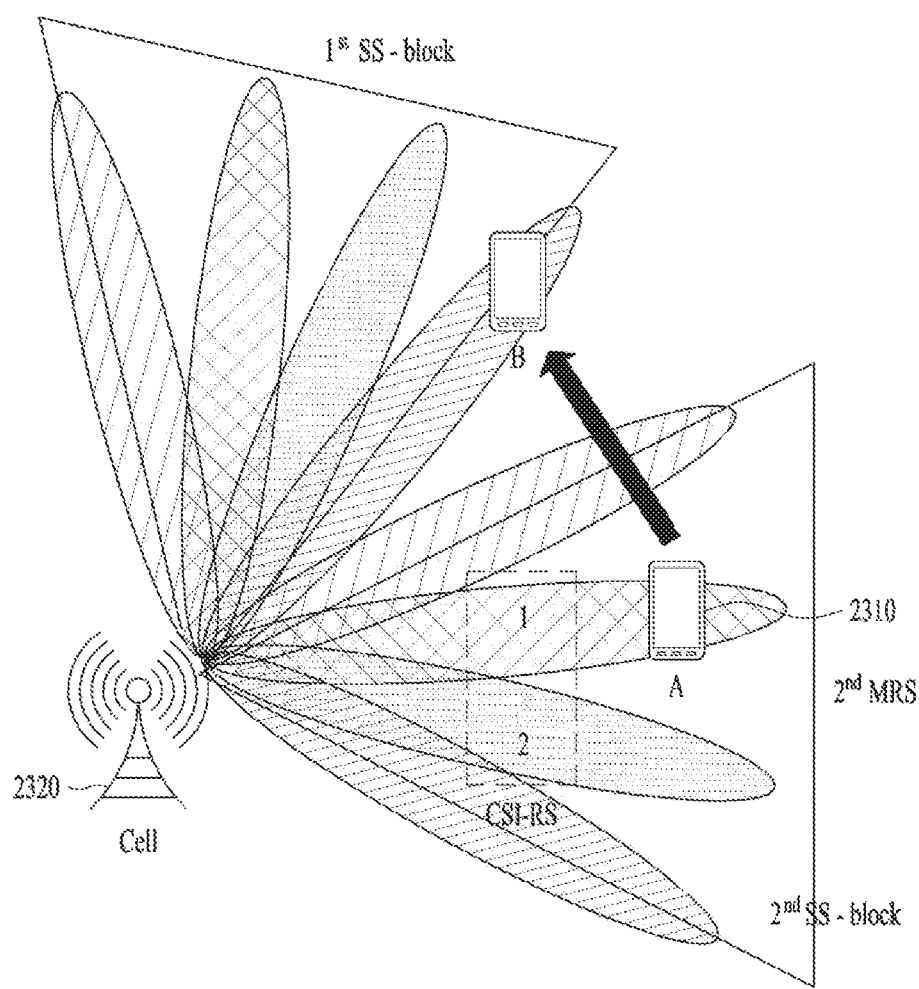
FIG. 23 is a diagram illustrating a situation requiring beam recovery.

In another example, referring to FIG. 23, the UE 2310 has been configured with CSI-RS #1 and CSI-RS #2. The UE 2310 may determine a beam state by the CSI-RSs. For example, if the UE 2310 moves from location A to location B, the UE 2310 may fail to detect a configured preferred beam. Then, the UE may perform a beam recovery procedure. That is, if the UE 2310 fails to detect the preferred beam from a configured CSI-RS, the UE may report a preferred SS block to the eNB. For example, the UE 2310, which has moved from location A to location B, may prefer a first SS block. Therefore, when the UE 2310 fails to detect the preferred beam from the configured CSI-RS, the UE 2310 may report the preferred SS block as a beam recovery signal to the eNB.

Figure 24:
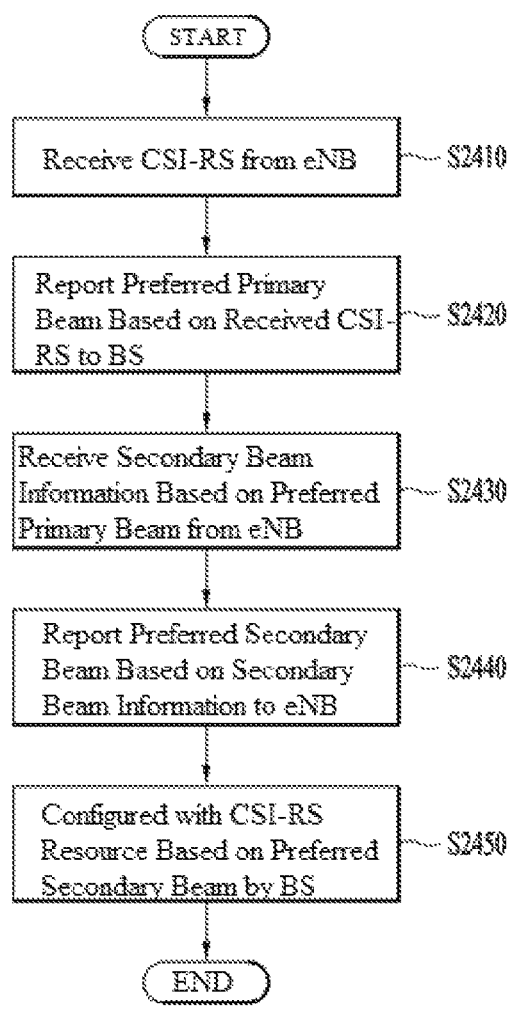
FIG. 24 is a flowchart illustrating a beam determination method in a communication system.

That is, both an SS block and a CSI-RS may be candidate beams as a beam recovery beam or signal. That is, the UE may perform beam recovery using at least one of an SS block or a CSI-RS, and the present disclosure is not limited to this embodiment. Referring to FIG. 24, an SS burst set and a periodic CSI-RS may be configured on the time axis. The SS burst set may include a plurality of SS blocks, and the UE 2310 may identify a preferred SS block from the SS burst set. For example, the SS block may be configured to cover in all directions in a cell. Accordingly, an RS available as a candidate for the beam recovery procedure may not be defined separately. For example, even though only a small number of CSI-RSs are configured for the UE 2310, the UE 2310 performs beam recovery using the SS block covering all areas. Thus, the beam recovery procedure may be performed irrespective of the CSI-RSs. Then, the UE 2310 may be allocated a UL resource by the eNB 2320, and report a primary beam to the eNB 2320 in the allocated uplink resource. The eNB 2320 may then show secondary beams QCLed with the primary beam to the UE. That is, the primary beam and the secondary beams may be in the QCL relationship as described before, and the primary beam may be determined by a CSI-RS resource set. Herein, the eNB may provide the UE 2310 with CSI-RS information for secondary beams QCLed with the primary beam. The UE 2310 may determine a preferred secondary beam based on the information received from the eNB 2320 and report the determined secondary beam to the eNB 2320. The eNB 2320 may configure a CSI-RS resource for the UE 2320 based on the information reported by the UE. That is, the eNB 2320 may detect a new CSI-RS based on an SS block reported by the UE and re-configure the CSI-RS for the UE 2310. As described above, the primary beam may be in the QCL relationship with the secondary beams, and the eNB 2320 may show the secondary beams to the UE 2310 based on the QCL relationship and perform CSI-RS reconfiguration. Therefore, beam recovery may be performed efficiently.

Further, a description will be given of a configuration for changing or updating a CSI-RS resource in relation to the afore-described beam recovery or change. As described above, when a problem occurs to a primary beam of the UE, when the UE detects a better primary beam, or when the UE fails to detect a secondary beam, the beam recovery and CSI-RS change is needed. More specifically, if the radio resource management (RRM) measurement of an MRS is less than a threshold, the UE needs to change the primary beam (motivation 1). That is, if the primary beam does not satisfy a predetermined criterion, the UE may change the primary beam. In another example, if a preferred primary beam detected from an MRS has no relation to a current configured CSI-RS resource set (or subset), the UE needs to change the CSI-RS resource set (or subset) (motivation 2). In another example, if the UE fails to detect a secondary beam exceeding a threshold from the current configured CSI-RS resource subset, the UE needs to change the CSI-RS resource subset (motivation 3). That is, the UE may change an active CSI-RS resource set.

In consideration of the above situation, a CSI-RS resource update may be performed. More specifically, the UE may report BSI to the eNB. Herein, the reporting may be triggered by the network or the UE.

More specifically, the eNB may reconfigure a CSI-RS resource set (or subset) for the UE based on the updated primary beam information.

Considering the situations of motivation 1 and motivation 2, the CSI-RS resource set itself needs to be changed. Further, if the preferred primary beam detected from the MRS has no relation to the current configured CSI-RS resource set (or subset), the CSI-RS resource set itself needs to be changed.

If only the situation of motivation 3 is considered, only a CSI-RS resource subset in the CSI-RS resource set may be changed. Herein, the UE may determine a secondary beam by using the CSI-RS resource subset reconfigured by the eNB.

2-6-1. CSI-RS Resource Update Triggered by Network

As described above, a case in which an RRM measurement is less than a threshold may be considered. If a reported RRM measurement is less than the threshold, the eNB may allocate a PUSCH resource for BSI reporting to the UE. The UE may report BSI on a PUSCH or a MAC-CE to the eNB. When the UE reports the BSI on the PUSCH, the UE may multiplex and transmit the BSI in the PUSCH resource. On the other hand, when the UE reports the BSI in a MAC-CE, the UE may include and transmit the BSI in the MAC-CE, and the eNB may be aware of the inclusion of the BSI in the MAC-CE. In another example, both of the PUSCH and the MAC-CE may be supported. Then, the eNB may also indicate which one between the PUSCH and the MAC-CE is to be used, when requesting BSI reporting.

In another example, the UE may transmit BSI in a MAC-CE to the eNB without an additional BSI reporting request from the eNB.

The eNB may update a CSI-RS resource set based on the reported information.

2-6-2. CSI-RS Resource Update Triggered by UE 2-6-2-1. RACH-Based

The UE may request change of a CSI-RS resource set to the eNB by an RACH signal in consideration of the situations of motivation 1 and motivation 2. For example, the RACH signal may be a contention-based RACH signal or a UE dedicated RACH signal. For example, the contention-based RACH signal is based on contention and thus may experience collision, thereby lengthening latency. In contrast, the UE dedicated RACH signal is contention-free and thus may avoid collision.

The eNB may allocate a UL resource to the UE by an RAR in a RACH procedure. That is, the eNB may receive an RACH preamble from the UE and allocate UL resources to the UE in response to the RACH preamble. Subsequently, the UE may report BSI in an RRC connection request or RRC connection re-establishment request message to the eNB. If the UE and the eNB have difficulty in communicating with each other by an existing configured beam pair due to movement of the UE or an obstacle, the UE needs to reconfigure a primary beam in the RACH procedure.

2-6-2-2. SR-Based

Considering the situations of motivation 1 and motivation 2, the UE may request change of a CSI-RS resource set to the eNB by an SR. that is, the eNB may allocate a PUSCH resource to the UE based on the received SR. The UE may report BSI in a MAC-CE to the eNB. The eNB may check the MAC-CE of the signal received from the UE and acquire the BSI (or primary beam information) from the MAC-CE.

2-6-2-3. PUCCH-Based

Considering the situations of motivation 1 and motivation 2, the UE may report a preferred CSI-RS resource or CSI-RS port on a PUCCH to the eNB. For example, the UE may report preferred primary beam information on the PUCCH. However, since PUCCH information has a small number of feedback bits, the UE may set the number of reported primary beams to 1 or a small number. Further, for example, the UE may report only the index of the preferred primary beam on the PUCCH, without transmitting the RSRP of the primary beam. That is, the UE may report only part of the BSI on the PUCCH.

In another example, a field that distinguishes preferred primary beam information from a preferred CSI-RS resource transmission may be defined in a PUCCH field. Further, for example, a field that distinguishes preferred primary beam information from a preferred CSI-RS port may be defined in a PUCCH field.

Further, for example, as the PUCCH has a small number of feedback bits, the eNB may allocate a PUSCH resource to the UE, and the UE may report BSI in the allocated PUSCH resource. The UE may not report a primary beam on the PUCCH. That is, the UE may request only a reconfiguration of a CSI-RS resource set on the PUCCH, while reporting BSI to the eNB on the PUSCH.

In another example, when the UE has reported a preferred primary beam on a PUCCH, the eNB may reconfigure at least one of a CSI-RS resource set or a CSI-RS resource subset for the UE.

The UE may perform beam management by using periodically transmitted PUCCH resources, without separately being allocated a UL resource through an SR. As such, only when beam refinement is required, the eNB may request reporting to the UE. Further, for example, if a PUCCH period is short, beam information may be reported faster than on an RACH, a MAC-CE, or a UL data channel. That is, this may be efficient when the location of the UE is frequently changed or movement of the UE is considered.

Further, for example, in the case where the UE intends to change a CSI-RS resource set but delay of RRM reporting makes it difficult to trigger changing of the CSI-RS resource set, the triggering may be made using a PUCCH, and the present disclosure is not limited to this embodiment.

In another example, considering the situation of motivation 3, the UE may request change of a CSI-RS resource subset to the eNB via the PUCCH. Herein, the UE may define a new field for requesting changing of a CSI-RS resource subset. Therefore, the UE may request changing of a CSI-RS resource subset via the PUCCH. Further, the UE may transmit BSI on the PUSCH in an L1 operation or report the BSI in a MAC-CE in an L2 operation. In the L1 operation, the BSI may be multiplexed in a PUSCH resource. In the L2 operation, as the eNB has requested BSI to the UE, the eNB may be aware that the BSI is included in the MAC-CE. Further, for example, the UE may support both of the PUSCH and the MAC-CE. Then, the eNB may indicate which of the two channels is to be used to the UE, when requesting BSI reporting. The UE may select a reporting method based on information included in the BSI reporting request, and the present disclosure is not limited to this embodiment.

FIG. 24 is a flowchart illustrating a beam determination method in a communication system.

A UE may receive a CSI-RS from an eNB (S2410). As described before with reference to FIGS. 1 to 23, the CSI-RS may be an MRS. Further, the CSI-RS may correspond to an SS block, as described before.

The UE may then report a preferred primary beam based on the received CSI-RS to the eNB (S2420). As described before with reference to FIGS. 1 to 23, the preferred primary beam may be a primary beam that the UE wants to use. The UE may then receive secondary beam information based on the preferred primary beam from the eNB (S2430). As described before with reference to FIGS. 1 to 23, the secondary beam information may specify at least one secondary beam QCLed with the primary beam. For example, the primary beam may correspond to a CSI-RS resource set, the secondary beams may correspond to CSI-RS resources. As the secondary beams correspond to CSI-RS resources, the primary beam may be represented as QCLed based on the CSI-RS resources. A beam that the UE actually uses may be a secondary beam. That is, the primary beam QCLed with the secondary beam may be defined for beam management, as described before.

Thereafter, the UE may report a preferred secondary beam based on the secondary beam information to the eNB (S2440). Then, the UE may be configured with a CSI-RS resource based on the preferred secondary beam by the eNB. As described before with reference to FIGS. 1 to 23, the preferred secondary beam may correspond to the CSI-RS resource. As described above, the beam actually used by the UE may be the secondary beam. Further, for example, a CRI may indicate a secondary beam and the UE may complete beam configuration based on the CRI. Further, for example, the information about the preferred primary beam and the preferred secondary beam may be transmitted to the eNB by at least one of an RACH, a MAC-CE, or UL data. Further, for example, the determined beam may need to be changed due to motivation 1 to motivation 3 as described before. That is, when the preferred primary beam and the preferred secondary beam do not satisfy a threshold, the UE may change the beam.

The UE may transmit a beam recovery signal to the eNB. After being allocated a UL resource by the eNB, the UE may report primary beam information. The eNB may show secondary beams QCLed with a reported primary beam. The UE may report a preferred secondary beam among the secondary beams QCLed with the primary beam to the eNB. Then, the eNB may configure a CSI-RS for the UE by the preferred secondary beam. That is, considering the QCL relationship between the primary beam and the secondary beam, the beam to be used by the UE may be determined, as described before.

Device Configuration

Figure 25:
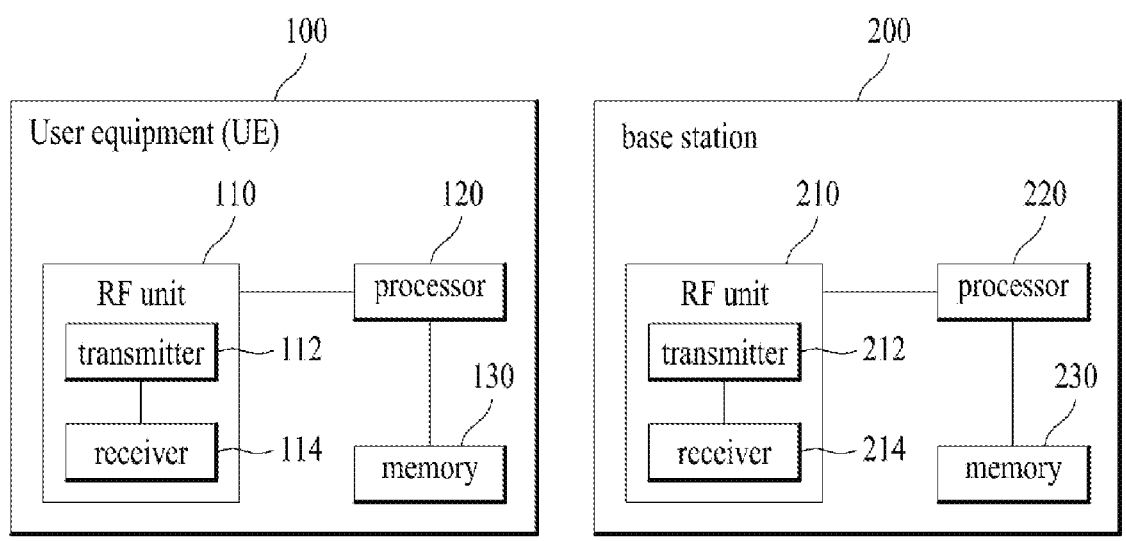
FIG. 25 is a block diagram illustrating a UE and a BS which are related to an embodiment of the present disclosure.

FIG. 25 is a block diagram showing the configuration of a UE and a BS according to one embodiment of the present disclosure. In FIG. 25, the UE 100 and the BS 200 may include radio frequency (RF) units 110 and 210, processors 120 and 220 and memories 130 and 230, respectively. Although a 1:1 communication environment between the UE 100 and the BS 200 is shown in FIG. 25, a communication environment may be established between a plurality of UEs and the BS. In addition, the BS 200 shown in FIG. 25 is applicable to a macro cell BS and a small cell BS.

The RF units 110 and 210 may include transmitters 112 and 212 and receivers 114 and 214, respectively. The transmitter 112 and the receiver 114 of the UE 100 are configured to transmit and receive signals to and from the BS 200 and other UEs and the processor 120 is functionally connected to the transmitter 112 and the receiver 114 to control a process of, at the transmitter 112 and the receiver 114, transmitting and receiving signals to and from other devices. The processor 120 processes a signal to be transmitted, sends the processed signal to the transmitter 112 and processes a signal received by the receiver 114.

If necessary, the processor 120 may store information included in an exchanged message in the memory 130. By this structure, the UE 100 may perform the methods of the various embodiments of the present disclosure.

The transmitter 212 and the receiver 214 of the BS 200 are configured to transmit and receive signals to and from another BS and UEs and the processor 220 are functionally connected to the transmitter 212 and the receiver 214 to control a process of, at the transmitter 212 and the receiver 214, transmitting and receiving signals to and from other devices. The processor 220 processes a signal to be transmitted, sends the processed signal to the transmitter 212 and processes a signal received by the receiver 214. If necessary, the processor 220 may store information included in an exchanged message in the memory 230. By this structure, the BS 200 may perform the methods of the various embodiments of the present disclosure.

The processors 120 and 220 of the UE 100 and the BS 200 instruct (for example, control, adjust, or manage) the operations of the UE 100 and the BS 200, espectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present disclosure may be called controllers, microcontrollers, microprocessors, microcomputers, etc. The processors 120 and 220 may be implemented by hardware, firmware, software, or a combination thereof.

If the embodiments of the present disclosure are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

In a firmware or software configuration, the method according to the embodiments of the present disclosure may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present disclosure has been given to enable those skilled in the art to implement and practice the disclosure. Although the disclosure has been described with reference to the preferred embodiments, those skilled in the art will appreciate that various modifications and variations can be made in the present disclosure without departing from the spirit or scope of the disclosure described in the appended claims. Accordingly, the disclosure should not be limited to the specific embodiments described herein, but should be accorded the broadest scope consistent with the principles and novel features disclosed herein. Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Both of a product invention and a method invention have been described in the disclosure, and may be applied complementarily, when needed.

INDUSTRIAL APPLICABILITY

The aforementioned contents can be applied not only to a 3GPP system and an LTE-A system but also to various wireless communication systems including an IEEE 802.16x system and an IEEE 802.11x system. Further, the proposed method can also be applied to an mmWave communication system using an ultrahigh frequency band.

What is claimed is:

1. A method of determining a beam to be used for communication by a user equipment (UE) in a millimeter wave (mmWave) communication system, the method comprising:
   receiving a synchronization signal (SS) block or a channel state information-reference signal (CSI-RS) from a base station (BS);
   reporting a preferred primary beam based on the received SS block or CSI-RS to the BS;
   receiving secondary beam information based on the preferred primary beam from the BS;
   reporting a preferred secondary beam based on the secondary beam information to the BS;
   changing the preferred primary beam based on the preferred primary beam and the preferred secondary beam not satisfying a threshold; and
   transmitting a beam recovery signal for reporting a changed preferred primary beam to the BS based on an uplink resource being allocated by the BS,
   wherein the UE is configured with a CSI-RS resource based on the preferred secondary beam by the BS, and
   wherein the secondary beam information includes information about at least one secondary beam quasi-co-located (QCLed) with the preferred primary beam.

2. The method according to claim 1, wherein a CSI-RS resource set is determined based on a primary beam, and a CSI-RS resource is determined based on a secondary beam.

3. The method according to claim 2, wherein the preferred secondary beam is indicated by a CSI-RS resource index (CRI).

4. The method according to claim 1, wherein information about the preferred primary beam and information about the preferred secondary beam are transmitted in at least one of a random access channel (RACH), a medium access control-control element (MAC-CE), or uplink data.

5. The method according to claim 1, wherein the CSI-RS resource is mapped to a symbol and multiple CSI-RS ports, wherein the preferred secondary beam is indicated by a CSI-RS resource index (CRI) and a CSI-RS port index.

6. The method according to claim 5, wherein the multiple CSI-RS ports are multiplexed in at least one of frequency division multiplexing and time division multiplexing in the symbol.

7. The method according to claim 1, wherein the UE receives changed secondary beam information based on the changed preferred primary beam from the BS, determines a changed preferred secondary beam based on the changed secondary beam information, reports the changed preferred secondary beam to the BS, and is configured with a changed CSI-RS resource based on the changed preferred secondary beam by the BS.

8. The method according to claim 7, wherein the changed preferred second beam information includes information about at least one secondary beam QCLed with the changed primary beam.

9. The method according to claim 1, wherein the primary beam corresponds to a wide beam or rough beam, and the secondary beam corresponds to a narrow beam or fine beam.

10. The method according to claim 1, wherein the CSI-RS is a reference signal used for beam management, and corresponds to at least one of a measurement reference signal (MRS) or an SS block.

11. A user equipment (UE) for determining a beam to be sued for communication in a millimeter wave (mmWave) communication system, the UE comprising:
a receiver configured to receive a signal from an external device;
a transmitter configured to transmit a signal to an external device; and
a processor configured to control the receiver and the transmitter,
wherein the processor is configured to:
receive a synchronization signal (SS) block or a channel state information-reference signal (CSI-RS) from a base station (BS) through the receiver,
report a preferred primary beam based on the received SS block or CSI-RS to the BS through the transmitter,
receive secondary beam information based on the preferred primary beam from the BS through the receiver,
report a preferred secondary beam based on the secondary beam information to the BS through the transmitter,
change the preferred primary beam based on the preferred primary beam and the preferred secondary beam not satisfying a threshold, and
transmit a beam recovery signal for reporting a changed preferred primary beam to the BS through the transmitter based on an uplink resource being allocated by the BS,
wherein a CSI-RS resource is configured by the BS based on the preferred secondary beam, and
wherein the secondary beam information includes information about at least one secondary beam quasi-co-located (QCLed) with the preferred primary beam.

12. The UE according to claim 11, wherein a CSI-RS resource set is determined based on a primary beam, and a CSI-RS resource is determined based on a secondary beam.

13. The UE according to claim 12, wherein the preferred secondary beam is indicated by a CSI-RS resource index (CRI).

14. The UE according to claim 11, wherein information about the preferred primary beam and information about the preferred secondary beam are transmitted in at least one of a random access channel (RACH), a medium access control-control element (MAC-CE), or uplink data.

15. The UE according to claim 11, wherein the CSI-RS resource is mapped to a symbol and multiple CSI-RS ports,
wherein the preferred secondary beam is indicated by a CSI-RS resource index (CRI) and a CSI-RS port index.

16. The UE according to claim 15, wherein the multiple CSI-RS ports are multiplexed in at least one of frequency division multiplexing and time division multiplexing in the symbol.

17. The UE according to claim 16, wherein the processor is configured to receive changed preferred secondary beam information based on the changed primary beam from the BS through the receiver, to determine a changed secondary beam based on the changed preferred secondary beam information, to report the changed preferred secondary beam to the BS through the transmitter, and to be configured with a changed CSI-RS resource based on the changed preferred secondary beam by the BS.

18. The UE according to claim 17, wherein the changed second beam information includes information about at least one secondary beam QCLed with the changed preferred primary beam.

19. The UE according to claim 11, wherein the primary beam corresponds to a wide beam or rough beam, and the secondary beam corresponds to a narrow beam or fine beam.

20. The UE according to claim 11, wherein the CSI-RS is a reference signal used for beam management, and corresponds to at least one of a measurement reference signal (MRS) or an SS block.

* * * * *